(12) United States Patent
Rekimto

(10) Patent No.: US 9,900,551 B2
(45) Date of Patent: Feb. 20, 2018

(54) COMMUNICATION TERMINAL AND INFORMATION PROCESSING APPARATUS

(71) Applicant: Sony Corporation, Tokyo (JP)

(72) Inventor: Junichi Rekimto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 129 days.

(21) Appl. No.: 14/022,558

(22) Filed: Sep. 10, 2013

(65) Prior Publication Data

US 2014/0078243 A1    Mar. 20, 2014

(30) Foreign Application Priority Data

Sep. 18, 2012 (JP) .................. 2012-204277

(51) Int. Cl.
    *H04N 7/14* (2006.01)
    *H04N 7/15* (2006.01)

(52) U.S. Cl.
    CPC ..................... *H04N 7/15* (2013.01)

(58) Field of Classification Search
    USPC .......................................... 348/14.01–14.09
    See application file for complete search history.

(56) References Cited

U.S. PATENT DOCUMENTS

| | | | | |
|---|---|---|---|---|
| 6,744,927 B1 * | 6/2004 | Kato | ...................... | G06T 9/005 370/263 |
| 7,800,642 B2 * | 9/2010 | Eshkoli | ............... | H04L 12/1822 348/14.08 |
| 8,358,321 B1 * | 1/2013 | Weidner | .................. | G09G 5/00 345/619 |
| 2005/0081160 A1 * | 4/2005 | Wee | ....................... | G06Q 10/10 715/755 |
| 2010/0302347 A1 * | 12/2010 | Shikata | ......................... | 348/36 |
| 2012/0293606 A1 * | 11/2012 | Watson | ................. | H04N 5/232 348/14.16 |
| 2012/0302347 A1 * | 11/2012 | Nicholson | ............... | A63F 13/06 463/37 |
| 2012/0313971 A1 * | 12/2012 | Murata | ........... | H04N 21/44008 345/660 |

FOREIGN PATENT DOCUMENTS

JP          2009-200697 A      9/2009

* cited by examiner

*Primary Examiner* — Maria El-Zoobi

(74) *Attorney, Agent, or Firm* — Chip Law Group

(57) ABSTRACT

There is provided a communication terminal including a captured image acquisition unit configured to acquire a captured image that is captured by an image capturing unit, the image capturing unit setting an upward direction as an image capturing direction, an image extraction unit configured to extract an image of a predetermined region from the captured image as an extracted image, a combined image acquisition unit configured to acquire a combined image generated by arranging the extracted image and an extracted image from one or more other communication terminals, and a display control unit configured to perform control in a manner that the combined image is displayed.

14 Claims, 16 Drawing Sheets

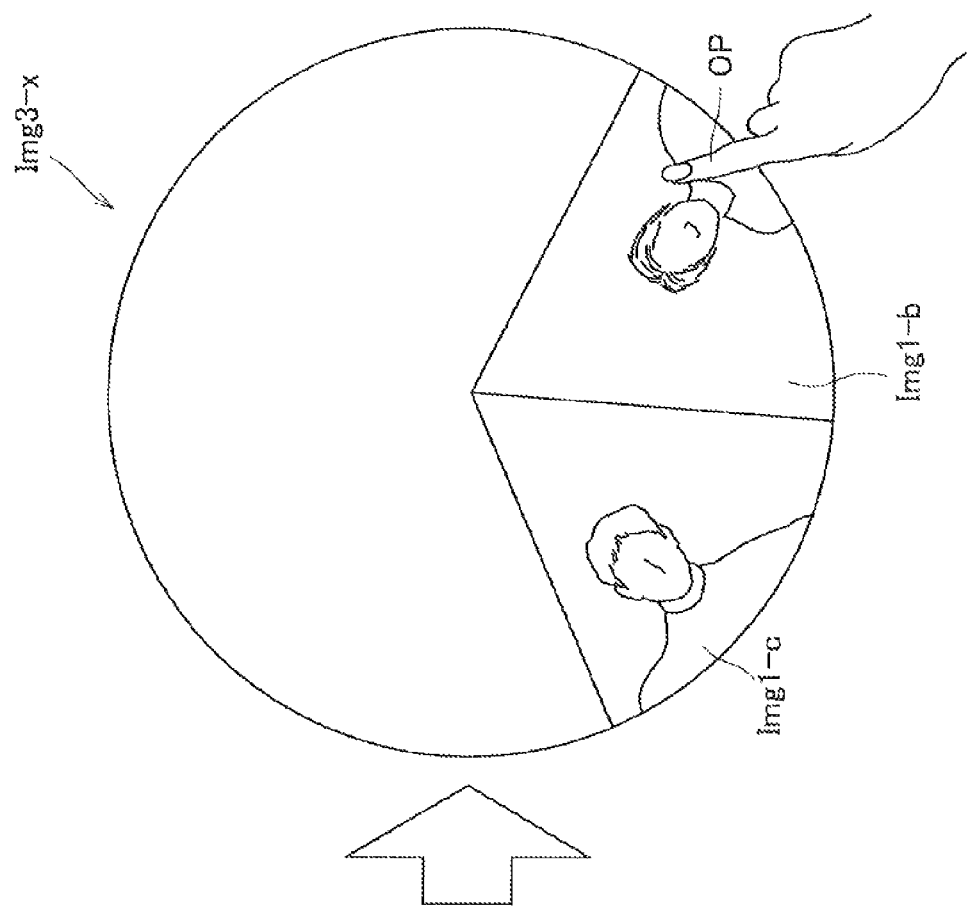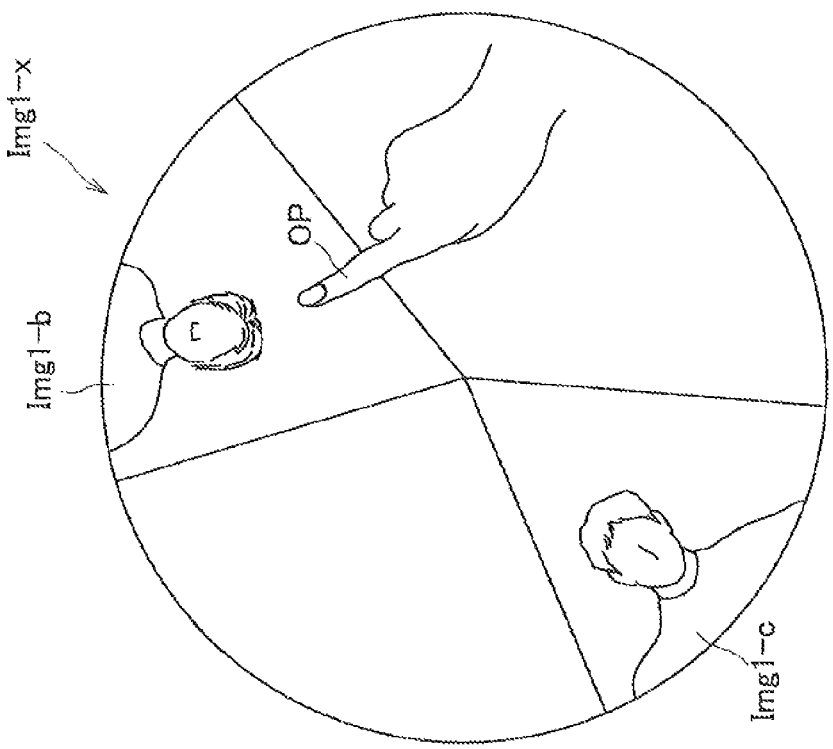
FIG.10

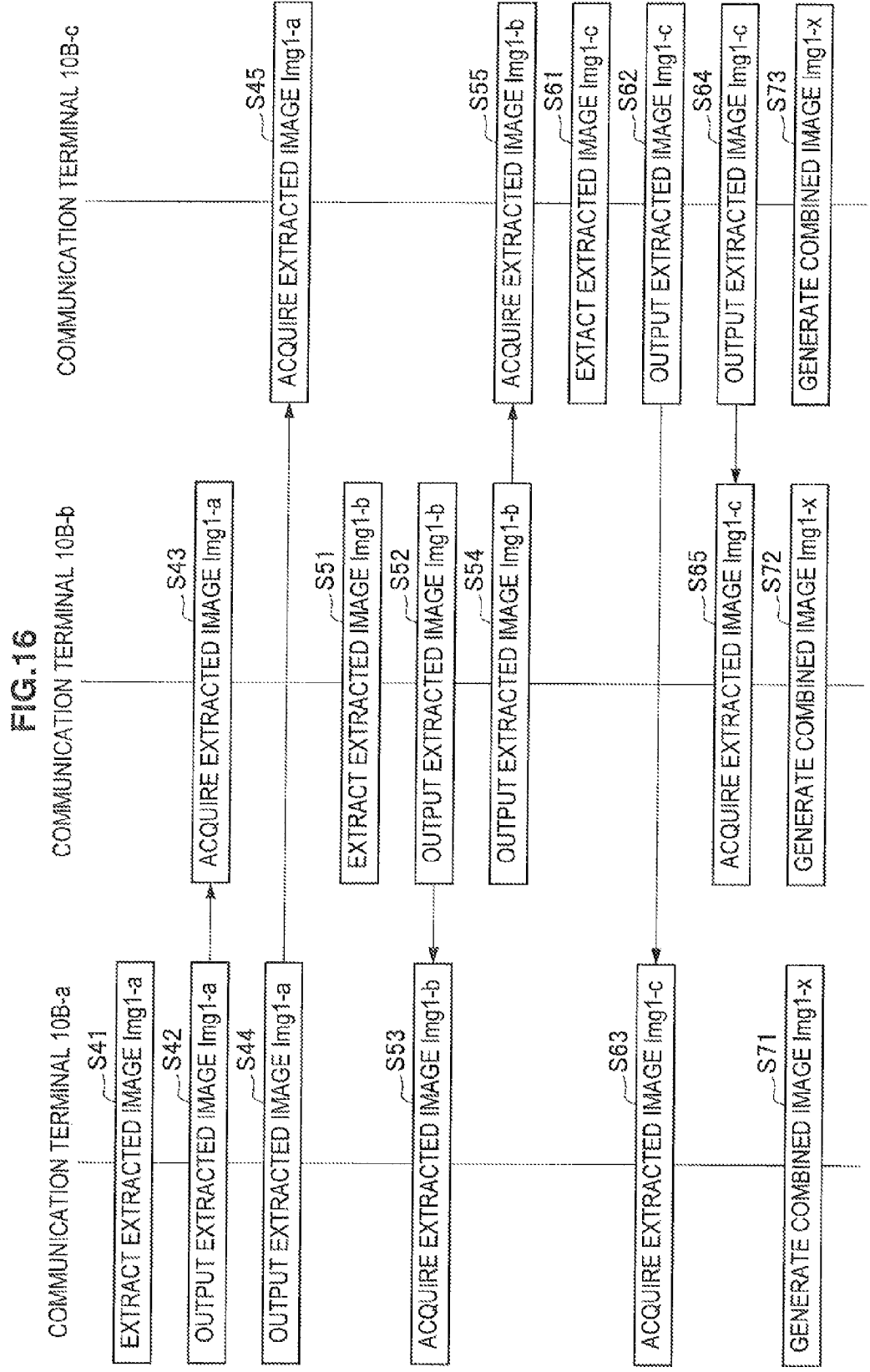

COMMUNICATION TERMINAL AND INFORMATION PROCESSING APPARATUS

BACKGROUND

The present disclosure relates to a communication terminal, a program, and an information processing apparatus.

In recent years, people have used a meeting system that allows participants in a meeting to hold the meeting while watching a screen having a captured image of another participant projected thereon (see, for example, JP 2009-200697A). However, a region that is not desired to be watched by the other participant is possibly projected on the screen in the meeting system. For example, when a participant who is at home holds a meeting, a private space such as a view in the house is possibly projected on the screen. When a meeting takes place among members in the same family, a member other than the members participating in the meeting is possibly projected on the screen.

In this way, a region that is not desired to be watched by another participant is projected on the screen, which is assumed to possibly lead to privacy invasion. Under such circumstances, the meeting system is frequently used, for example, for business matters. To the contrary, the meeting system is difficult to gain widespread use for home use. It is therefore desired to project, on the screen, an image that is obtained by removing the background. For example, it is possible to conceive of a technique of using information indicating a distance from a camera to remove the background.

SUMMARY

However, since such a technique has to include a configuration for detecting information that indicates a distance from a camera, a simple configuration is not capable of removing the background from a captured image. Thus, it is desired to realize a technique capable of easily reducing the possibility that, when a captured image of each of a plurality of participants is projected on a screen, a region that is not desired to be watched by another participant is also projected on the screen.

According to an embodiment of the present disclosure, there is provided a communication terminal including a captured image acquisition unit configured to acquire a captured image that is captured by an image capturing unit, the image capturing unit setting an upward direction as an image capturing direction, an image extraction unit configured to extract an image of a predetermined region from the captured image as an extracted image, a combined image acquisition unit configured to acquire a combined image generated by arranging the extracted image and an extracted image from one or more other communication terminals, and a display control unit configured to perform control in a manner that the combined image is displayed.

According to another embodiment of the present disclosure, there is provided a program for causing a computer to function as a communication terminal, the communication terminal including a captured image acquisition unit configured to acquire a captured image that is captured by an image capturing unit, the image capturing unit setting an upward direction as an image capturing direction, an image extraction unit configured to extract an image of a predetermined region from the captured image as an extracted image, a combined image acquisition unit configured to acquire a combined image generated by arranging the extracted image and an extracted image from one or more other communication terminals, and a display control unit configured to perform control in a manner that the combined image is displayed.

According to an embodiment of the present disclosure, there is provided an information processing apparatus including an extracted image acquisition unit configured to acquire extracted images that are extracted from captured images which are captured by a plurality of image capturing units, the plurality of image capturing units setting an upward direction as an image capturing direction, and an image combining unit configured to generate a combined image by arranging the extracted images.

According to an embodiment of the present disclosure, it is possible to easily reduce the possibility that, when a captured image of each of a plurality of participants is projected on a screen, a region which is not desired to be watched by another participant is also projected on the screen.

BRIEF DESCRIPTION OF THE DRAWINGS

FIG. 10 is a diagram illustrating a second example of the regeneration of the combined image by the image combining unit;

FIG. 16 is a diagram illustrating an example of an operation flow of the communication system according to the second embodiment of the present disclosure.

DETAILED DESCRIPTION OF THE EMBODIMENT(S)

Figure 1:
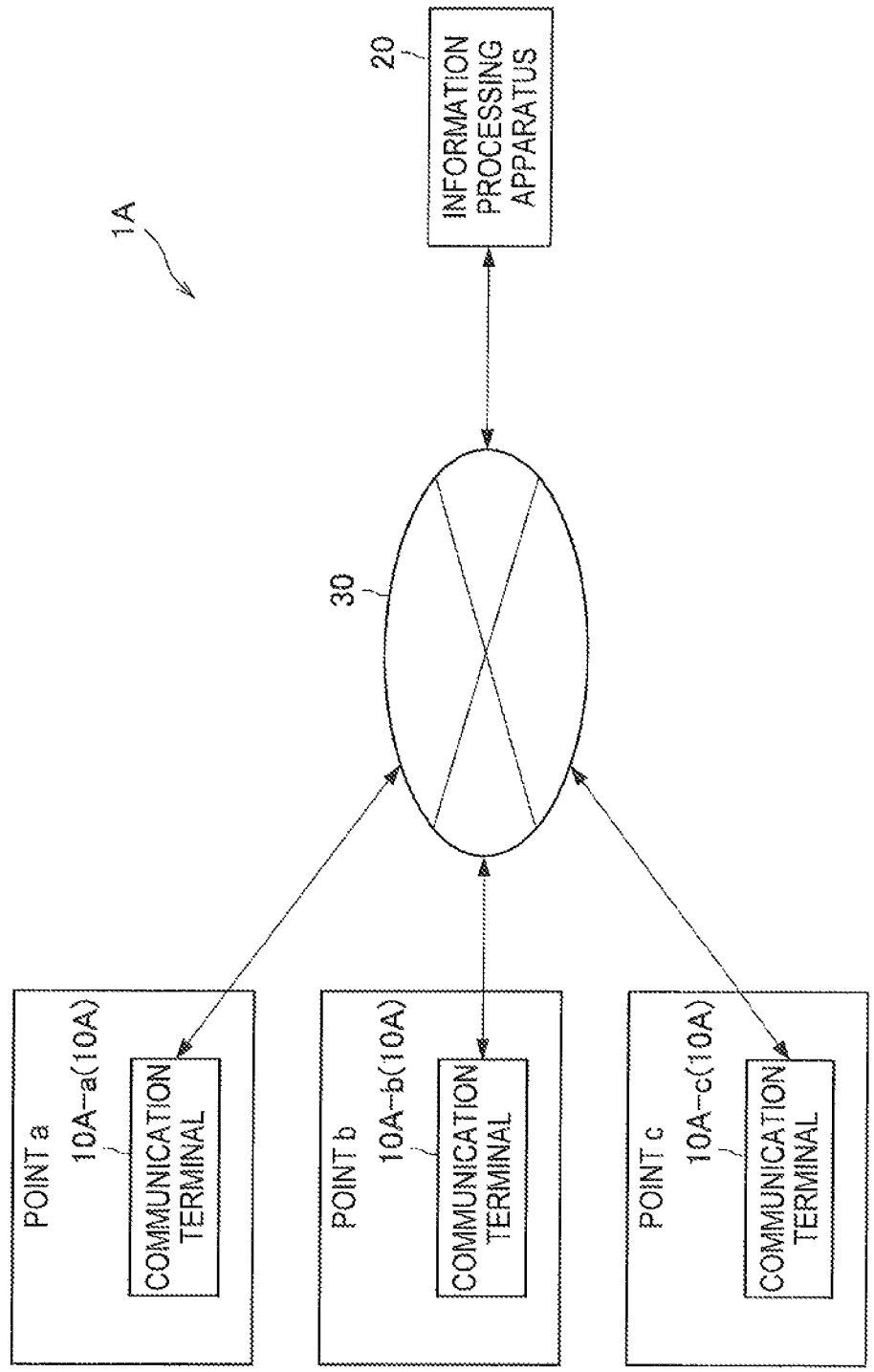
FIG. 1 is a diagram illustrating a configuration example of a communication system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, a plurality of structural elements having substantially identical functional configurations are sometimes distinguished by different alphabetic characters following the same reference numerals in the present specification and the drawings. However, if it is not necessary to individually distinguish the plurality of structural elements having the substantially identical functional configurations, only the same reference numerals are used.

The "detailed description of the embodiment(s)" will be made in the following item order.

1. First Embodiment
   1-1. Configuration Example of Communication System
   1-2. Functional Configuration Example of Communication Terminal
   1-3. Functional Configuration Example of Information Processing Apparatus
   1-4. Exterior (First Example) of Communication Terminal
   1-5. Description of Function Control (First Example)
   1-6. Description of Function Control (Second Example)
   1-7. Detailed Description of Function of Communication System
   1-8. Advantageous Effects Attained by Communication System
   1-9. Regeneration of Combined Image (First Example)
   1-10. Regeneration of Combined Image (Second Example)
   1-11. Example of Process to Be Executed
   1-12. Exterior (Second Example) of Communication Terminal
   1-13. Operation of Communication System
2. Second Embodiment
   2-1. Configuration Example of Communication System
   2-2. Functional Configuration Example of Communication Terminal
   2-3. Operation of Communication System
3. Conclusion <<1. First Embodiment>>

First, a first embodiment of the present disclosure will be described.

[1-1. Configuration Example of Communication System]

First of all, a configuration example of a communication system 1A according to the first embodiment of the present disclosure will be described. FIG. 1 is a diagram illustrating the configuration example of the communication system 1A according to the first embodiment of the present disclosure. As illustrated in FIG. 1, the communication system 1A includes a communication terminal 10A-a, a communication terminal 10A-b, and a communication terminal 10A-c as an example of a plurality of communication terminals 10A. Additionally, as illustrated in FIG. 1, the communication system 1A also includes an information processing apparatus 20.

The communication terminals 10A are capable of communicating with the other communication terminals 10A and the information processing apparatus 20 via a network 30. Although the present specification mainly describes the case where the communication system 1A includes the three communication terminals 10A (communication terminal 10A-a, communication terminal 10A-b, and communication terminal 10A-c) as an example of the plurality of communication terminals 10A, the number of communication terminals 10A that the communication system 1A includes is not particularly limited as far as the communication system 1A includes the plurality of communication terminals 10A.

The information processing apparatus 20 is capable of communicating with the communication terminals 10A via the network 30. Although the information processing apparatus 20 is configured to be separate from the communication terminals 10A in the example illustrated in FIG. 1, any of the plurality of communication terminals 10A may have a function of the information processing apparatus 20. Here, any of the communication terminals 10A that has the function of the information processing apparatus 20 may be identified in any way. For example, any of the communication terminals 10A that has the function of the information processing apparatus 20 may be decided in advance. Alternatively, one of the communication terminals 10A that is first to be activated, or one of the communication terminals 10A that is first to have a predetermined function validated may have the function of the information processing apparatus 20. Still alternatively, it may be dynamically changed which of the communication terminals 10A has the function of the information processing apparatus 20. The predetermined function will be described below.

Here, FIG. 1 illustrates the example in which the communication terminal 10A-a is present at a point a, the communication terminal 10A-b is present at a point b, and the communication terminal 10A-c is present at a point c. The plurality of communication terminals 10A may be present at the different points in this way, and may also be present at the same point. Let us assume below that users U of the plurality of communication terminals 10A are participants, and the participants attempt to communicate with another participant while watching a screen having a captured image of the other participant projected thereon.

Let us assume below that a user U-a1 and a user U-a2 are participants as users U of the communication terminals 10A, a user U-b is a participant as a user U of a communication terminal 10B, and a user U-c is a participant as a user U of a communication terminal 10C. However, the number of users U of each of the plurality of communication terminals 10A is not particularly limited.

Here, people have already used a meeting system that allows participants in a meeting to hold the meeting while watching a screen having a captured image of another participant projected thereon. However, a region that is not desired to be watched by the other participant is also possibly projected on the screen in such a meeting system. The present specification therefore proposes a technology capable of easily reducing the possibility that, when captured images of a plurality of participants are each projected on the screen, a region which is not desired to be watched by another participant is also projected on the screen.

As described above, the configuration example of the communication system 1A according to the first embodiment of the present disclosure has been explained.

[1-2. Functional Configuration Example of Communication Terminal]

Figure 2:
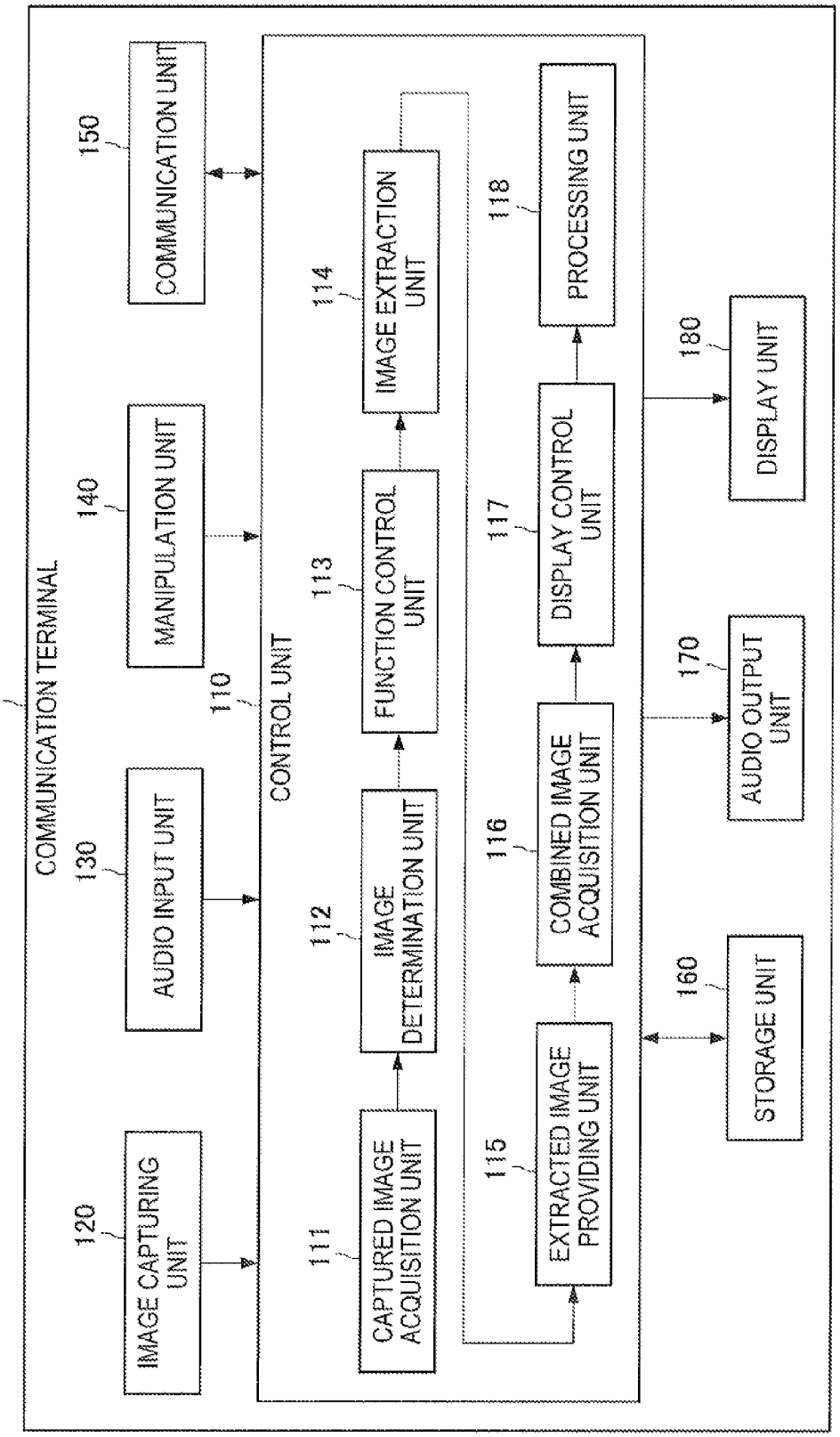
FIG. 2 is a diagram illustrating a functional configuration example of a communication terminal according to the first embodiment of the present disclosure.

Next, a functional configuration example of one of the communication terminals 10A according to the first embodiment of the present disclosure will be described. FIG. 2 is a diagram illustrating the functional configuration example of one of the communication terminals 10A according to the first embodiment of the present disclosure. As illustrated in FIG. 2, the communication terminals 10A each include a control unit 110, an image capturing unit 120, an audio input unit 130, a manipulation unit 140, a communication unit 150, a storage unit 160, an audio output unit 170, and a display unit 180.

The control unit 110 corresponds to a processor such as a Central Processing Unit (CPU). The control unit 110 executes a program stored on the storage unit 160 or another storage medium to perform various functions included in the control unit 110. The detailed description will be made below regarding functional blocks (captured image acquisition unit 111, image determination unit 112, function control unit 113, image extraction unit 114, extracted image providing unit 115, combined image acquisition unit 116, display control unit 117, and processing unit 118) included in the control unit 110.

The image capturing unit 120 captures a region in an image capturing range, and outputs the acquired captured image to the control unit 110. For example, a user U present in the image capturing range of the image capturing unit 120 can be a participant, and can attempt to communicate with another participant. Although the image capturing unit 120 is integrated with one of the communication terminals 10A in the example illustrated in FIG. 2, the image capturing unit 120 may be configured to be separate from the communication terminals 10A.

The audio input unit 130 detects a sound, and outputs the sound to the control unit 110. For example, when the user U is a participant, the audio input unit 130 is capable of detecting a voice articulated by the participant, and outputting the voice to the control unit 110. Although the audio input unit 130 is integrated with one of the communication terminals 10A in the example illustrated in FIG. 2, the audio input unit 130 may be configured to be separate from the communication terminals 10A.

The manipulation unit 140 detects a user manipulation, and outputs the user manipulation to the control unit 110. Since it is assumed in the present specification that the manipulation unit 140 includes a touch panel, the user manipulation is input with a finger or a thumb of the user U used as a manipulating object. However, the manipulation unit 140 may include hardware other than the touch panel. Although the manipulation unit 140 is integrated with one of the communication terminals 10A in the example illustrated in FIG. 2, the manipulation unit 140 may be configured to be separate from the communication terminals 10A.

The communication unit 150 is capable of communicating with the other communication terminals 10A and the information processing apparatus 20 via the network 30. For example, the communication unit 150 is capable of transmitting a sound detected by the audio input unit 130 to the other communication terminals 10A. For example, the communication unit 150 is also capable of receiving a sound from the other communication terminals 10A. The communication unit 150 is also capable of transmitting a captured image acquired by the image capturing unit 120, and receiving a captured image. Although the communication unit 150 is integrated with one of the communion terminals 10A in the example illustrated in FIG. 2, the communication unit 150 may be configured to be separate from the communication terminals 10A.

The storage unit 160 uses a storage medium such as semiconductor memory or a hard disk to store a program for operating the control unit 110. For example, the storage unit 160 is also capable of storing various types of data (such as setting information and content) used by the program. Although the storage unit 160 is integrated with one of the communication terminals 10A in the example illustrated in FIG. 2, the storage unit 160 may be configured to be separate from the communication terminals 10A.

The audio output unit 170 has a function of outputting a sound received by the communication unit 150. For example, the audio output unit 170 includes a speaker. Although the audio output unit 170 is integrated with one of the communication terminals 10A in the example illustrated in FIG. 2, the audio output unit 170 may be configured to be separate from the communication terminals 10A. If the audio output unit 170 is configured to be separate from the communication terminals 10A, the audio output unit 170 may be, for example, a headphone and an earphone.

The display unit 180 displays various types of information in accordance with control of the display control unit 117. The display unit 180 includes, for example, a Liquid Crystal Display (LCD), an organic Electroluminescence (EL) display device, or the like. Although the display unit 180 is integrated with one of the communication terminals 10A in the example illustrated in FIG. 2, the display unit 180 may be configured to be separate from the communication terminals 10A.

As described above, the functional configuration example of one of the communication terminals 10A according to the first embodiment of the present disclosure has been explained.

[1-3. Functional Configuration Example of Information Processing Apparatus]

Figure 3:
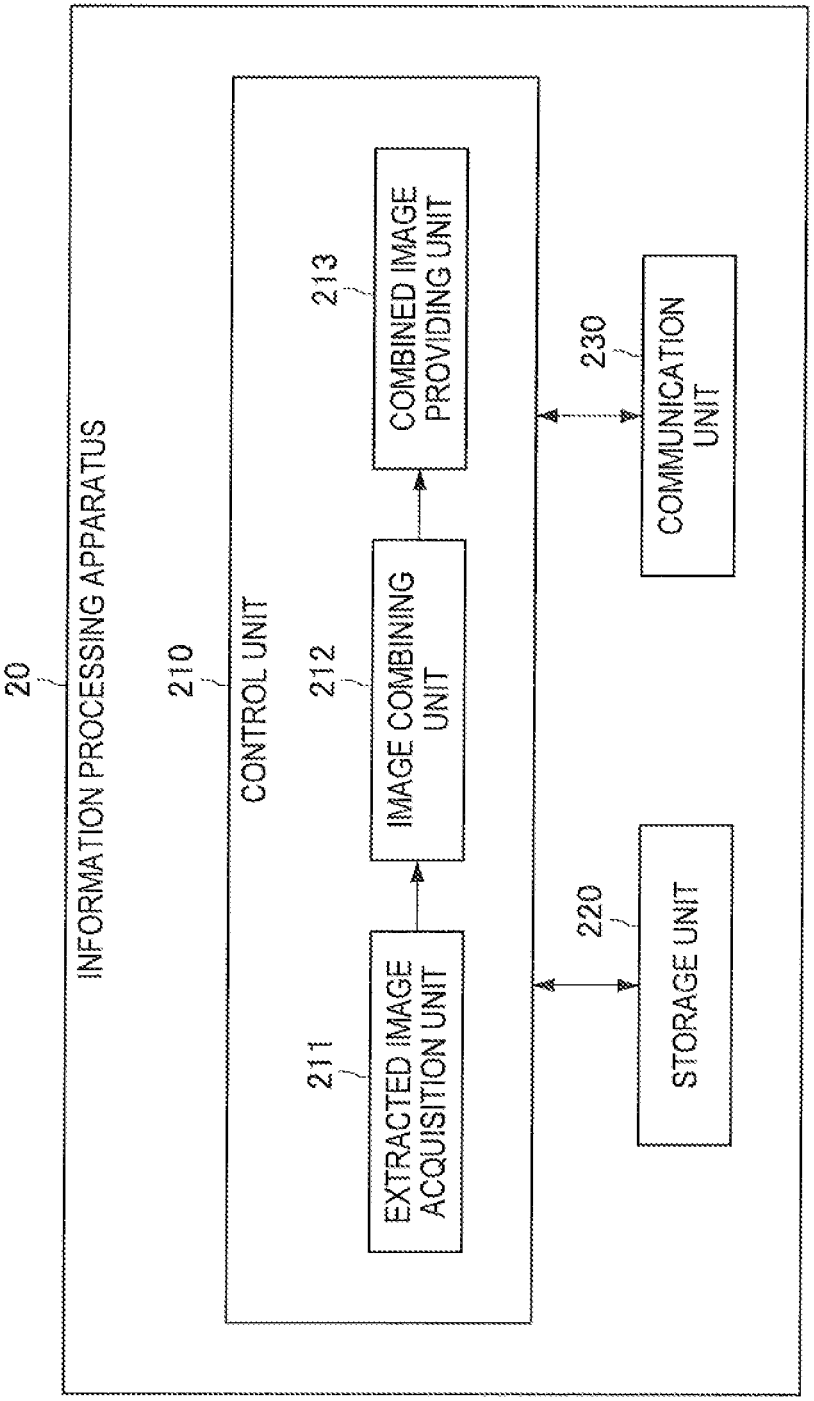
FIG. 3 is a diagram illustrating a functional configuration example of an information processing apparatus according to the first embodiment of the present disclosure.

Next, a functional configuration example of the information processing apparatus 20 according to the first embodiment of the present disclosure will be described. FIG. 3 is a diagram of illustrating the functional configuration example of the information processing apparatus 20 according to the first embodiment of the present disclosure. As illustrated in FIG. 3, the information processing apparatus 20 includes a control unit 210, a storage unit 220, and a communication unit 230.

The control unit 210 corresponds to, for example, a processor such as a CPU. The control unit 210 executes a program stored in the storage unit 220 or another storage medium to perform various functions included in the control unit 210. The detailed description will be made below regarding functional blocks (extracted image acquisition unit 211, image combining unit 212, and combined image providing unit 213) included in the control unit 210.

The storage unit 220 uses a storage medium such as semiconductor memory or a hard disk to store a program for operating the control unit 210. For example, the storage unit 220 is also capable of storing various types of data (such as setting information and content) used by the program. Although the storage unit 220 is integrated with the information processing apparatus 20 in the example illustrated in FIG. 3, the storage unit 220 may be configured to be separate from the information apparatus 20.

The communication unit 230 is capable of communicating with each of the communication terminals 10A via the network 30. For example, the communication unit 230 is capable of receiving captured images transmitted from the plurality of communication terminals 10A. The communication unit 230 is also capable of transmitting, to the plurality of communication terminals 10A, a combined image obtained by combining the captured images received from the plurality of communication terminals 10A. Although the communication unit 230 is integrated with the information processing apparatus 20 in the example illustrated in FIG. 3, the communication unit 230 may be configured to be separate from the information processing apparatus 20.

As described above, the functional configuration example of the information processing apparatus 20 according to the first embodiment of the present disclosure has been explained.

[1-4. Exterior (First Example) of Communication Terminal (First Example)]

Figure 4:
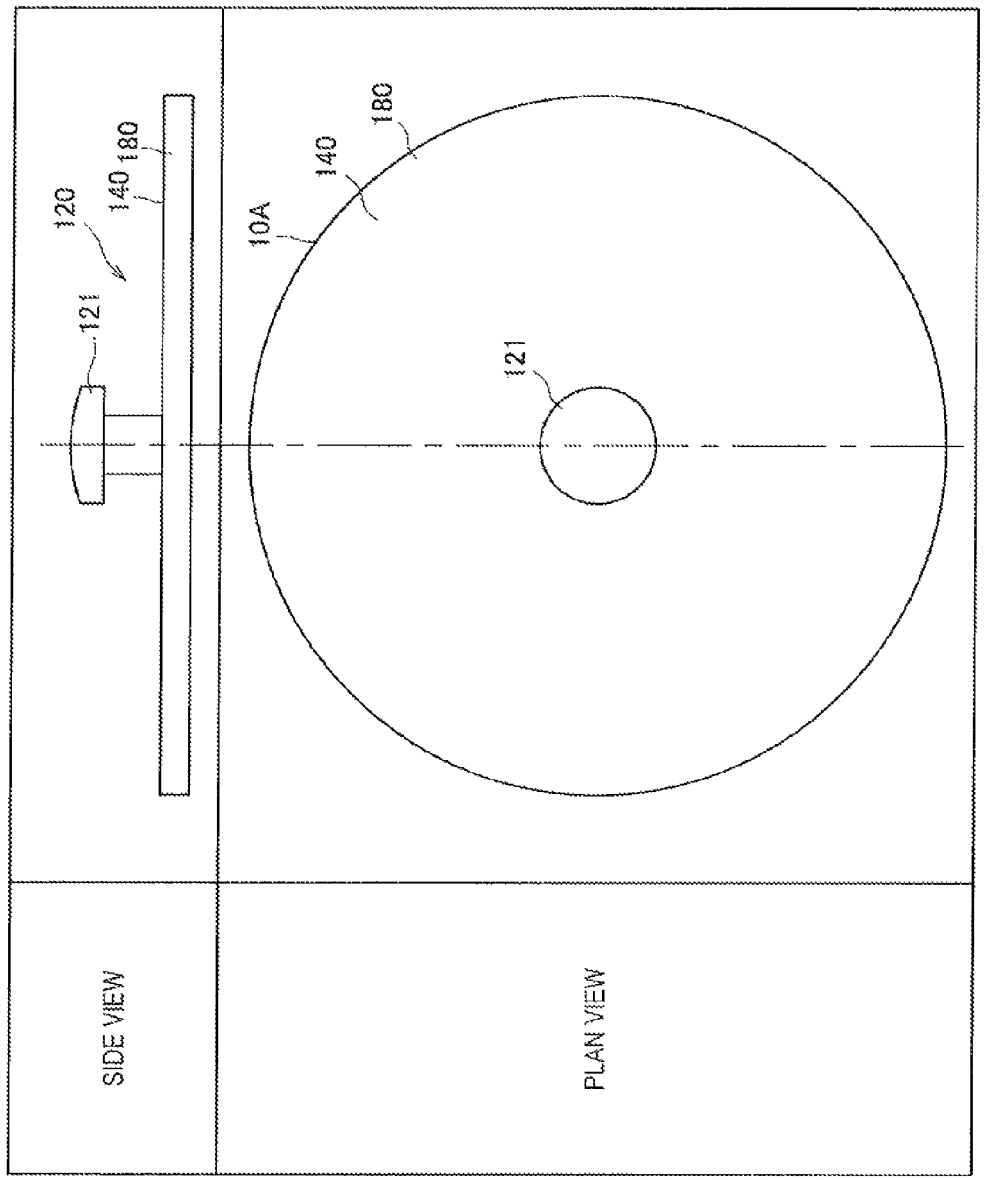
FIG. 4 is a diagram illustrating a first example of an exterior of the communication terminal according to the first embodiment of the present disclosure.

Next, an exterior (first example) of one of the communication terminals 10A according to the first embodiment of the present disclosure will be described. FIG. 4 is a diagram illustrating the exterior (first example) of one of the communication terminals 10A according to the first embodiment of the present disclosure. The image capturing unit 120 is provided at a predetermined position in the communication terminal 10A. For example, as illustrated in FIG. 4, the image capturing unit 120 may be provided at the center between the manipulation unit 140 and the display unit 180.

The manipulation unit 140 and the display unit 180 have circular shapes in the example illustrated in FIG. 4 because a combined image displayed on the display unit 180 is sometimes circular, as described below. However, the shapes of the manipulation unit 140 and the display unit 180 are not particularly limited. As illustrated in FIG. 4, the image capturing unit 120 includes a lens 121. The field angle of the image capturing unit 120 is not particularly limited, and for example, the lens 121 may be a lens (wide angle lens) having a wide field angle.

As described above, the exterior (first example) of one of the communication terminals 10A according to the first embodiment of the present disclosure has been explained.

[1-5. Description of Function Control (First Example)]

Figure 5:
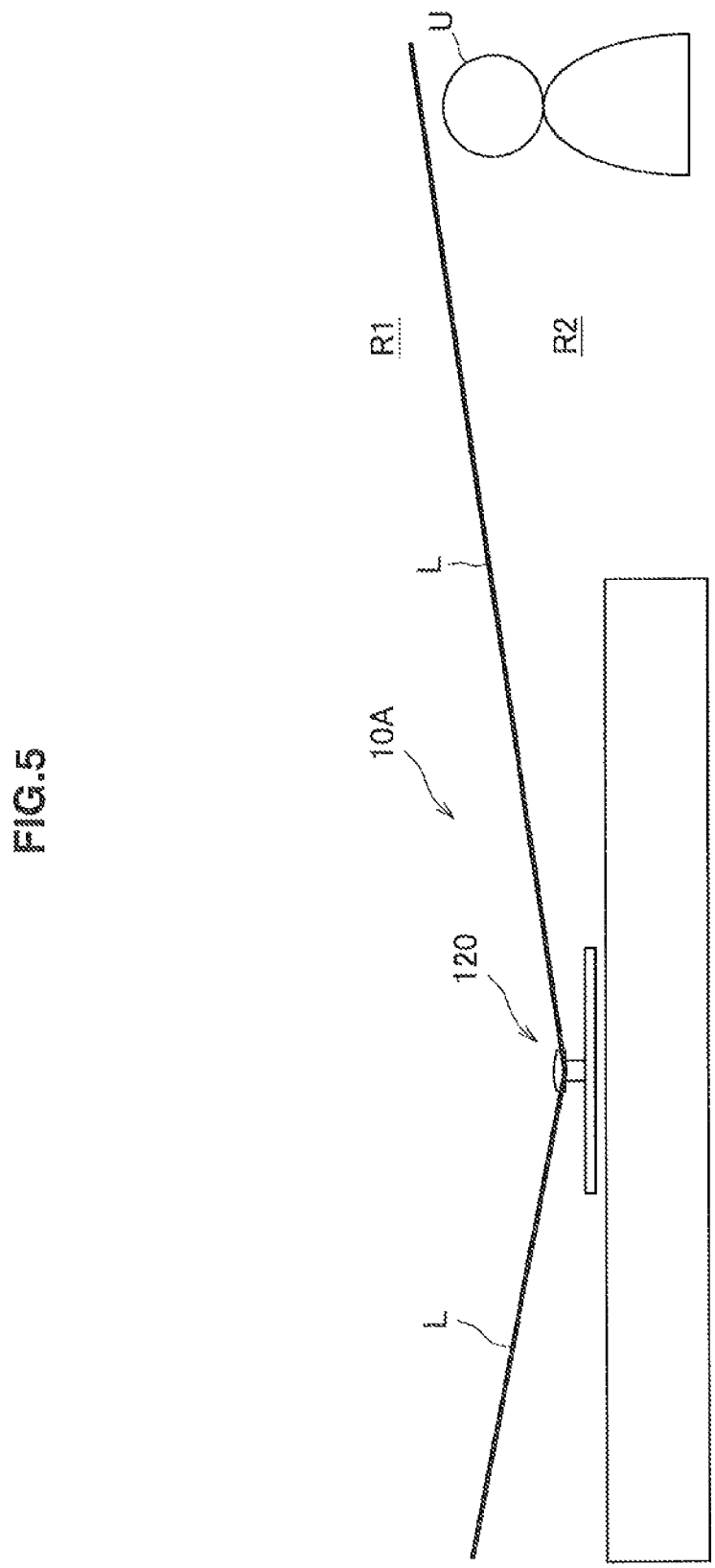
FIG. 5 is a diagram for describing a case where a user is not projected on a captured image.

Next, a first example of function control performed by the function control unit 113 will be described. FIG. 5 is a diagram for describing the case where a user is not projected on a captured image. As illustrated in FIG. 5, a space around one of the communication terminals 10A is classified into a region R1 in an image capturing range and a region R2 beyond the image capturing range with a line L regarded as a boundary that is defined in accordance with the field angle of the image capturing unit 120.

Let us assume here that the image capturing unit 120 sets an upward direction as an image capturing direction. For example, as illustrated in FIG. 5, when the image capturing unit 120 is provided in one of the communication terminals 10A, one of the communication terminals 10A is disposed on a horizontal support so that the image capturing unit 120 faces upward as the image capturing direction. The upward direction means, for example, facing upward in the vertical direction. As described above, the field angle of the lens 121 is not particularly limited as far as the field angle is less than 180 degrees.

In this case, as illustrated in FIG. 5, when a user U is present at a position far away from the image capturing unit 120, the user U is positioned in the region R2 that is beyond the image capturing range so that the user U is not projected on a captured image. Thus, it is possible to prevent the user U from being projected on the captured image against will of the user U. Additionally, it is expected to increase the possibility that a region (such as a ceiling) that may be watched by another participant is projected as a background of the captured image.

The captured image acquisition unit 111 acquires a captured image that is captured by the image capturing unit 120 having the above-described function. Next, the image determination unit 112 determines whether the user U is projected on the captured image to obtain the determination result. Here, the function control unit 113 controls the predetermined function included in one of the communication terminals 10A in accordance with the determination result of the image determination unit 112.

For example, as illustrated in FIG. 5, when the determination result of the image determination unit 112 indicates that the user U is not projected on the captured image, the function control unit 113 controls the predetermined function included in one of the communication terminals 10A. This is because the user U is not likely to attempt to communicate, as a participant, with another participant when the user U is not projected on the captured image. The predetermined function may be completely stopped or may be decreased in order to be limited. Various functions are conceivable as the predetermined function.

For example, the predetermined function may include at least a sound transmission function of the communication unit 150. The sound is a sound whose input is received by the audio input unit 130. For example, an audio channel is disconnected in order to limit the sound transmission function. The function control unit 113 limits the sound transmission function of the communication unit 150 in this way so it becomes possible to prevent a voice of the user U from being transmitted to the other communication terminals 10A when the user U does not attempt to communicate, as a participant, with another participant.

For example, the predetermined function may also include at least a function of the audio input unit 130, which receives an input of a sound. The function control unit 113 limits the function of the audio input unit 130, which receives the input of the sound, in this way so that it becomes possible to prevent a voice of the user U from being transmitted to the other communication terminals 10A when the user U does not attempt to communicate, as a participant, with another participant.

In addition, it may be determined in any way whether the user U is projected on a captured image. For example, the image determination unit 112 may determine whether the user U is projected on captured images, in accordance with whether a difference is generated between the captured images. For example, when the image capturing unit 120 consecutively captures images in chronological order, it may be determined whether the user U is projected on the captured images, in accordance with whether a difference is generated between a reference image and a present captured image. The reference image may be an image captured at predetermined time, or an image captured a predetermined time before the present captured image.

Alternatively, the image determination unit 112 may determine whether the user U is projected on the captured image, in accordance with whether a facial region is present in the captured image. For example, the image determination unit 112 may extract a feature amount from the captured image, compare the extracted feature amount with a feature amount of the facial region registered in advance, and determine based on the comparison result whether the facial region is present in the captured image. For example, the image determination unit 112 may determine whether the facial region is present in the captured image, in accordance with whether the comparison result indicates the coincidence.

As described above, the first example of the function control of the function control unit 113 has been explained.

[1-6. Description of Function Control (Second Example)]

Figure 6:
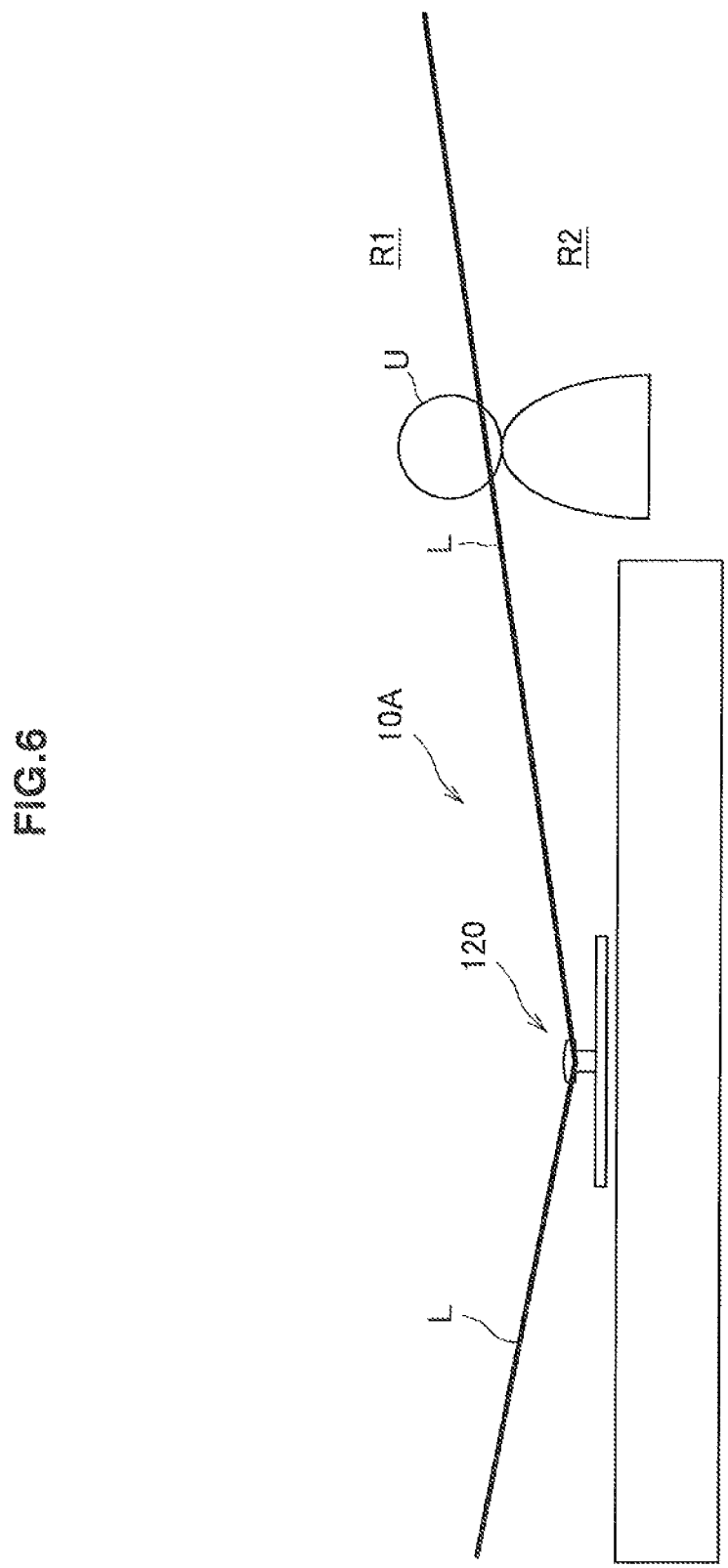
FIG. 6 is a diagram for describing a case where the user is projected on the captured image.

Next, a second example of the function control of the function control unit 113 will be described. FIG. 6 is a diagram for describing the case where a user is projected on a captured image. In the same way as the case illustrated in FIG. 5, a space around one of the communication terminals 10A is classified into a region R1 in an image capturing range and a region R2 beyond the image capturing range with a line L regarded as a boundary defined in accordance with the field angle of the image capturing unit 120. It is also assumed that the image capturing unit 120 faces upward as an image capturing direction.

As illustrated in FIG. 6, when a user U is present at a position near the image capturing unit 120, the user U is positioned in the region R1 in the image capturing range so that the user U is projected on the captured image. The captured image is captured by the captured image acquisition unit 111. Next, the image determination unit 112 determines whether the user U is projected on the captured image to obtain the determination result. Here, in the same way as the example illustrated in FIG. 5, the function control unit 113 controls the predetermined function included in one of the communication terminals 10A in accordance with the determination result of the image determination unit 112.

For example, as illustrated in FIG. 6, when the determination result of the image determination unit 112 indicates that the user U is projected on the captured image, the function control unit 113 validates the predetermined function included in one of the communication terminals 10A. This is because the user U is likely to attempt to communicate, as a participant, with another participant when the user U is projected on the captured image. The whole predetermined function may be validated, or a part of the predetermined function may be validated in order to validate the predetermined function. As described above, various functions are conceivable as the predetermined function.

As described above, the second example of the function control of the function control unit 113 has been explained.

[1-7. Detailed Description of Function of Communication System]

Figure 7:
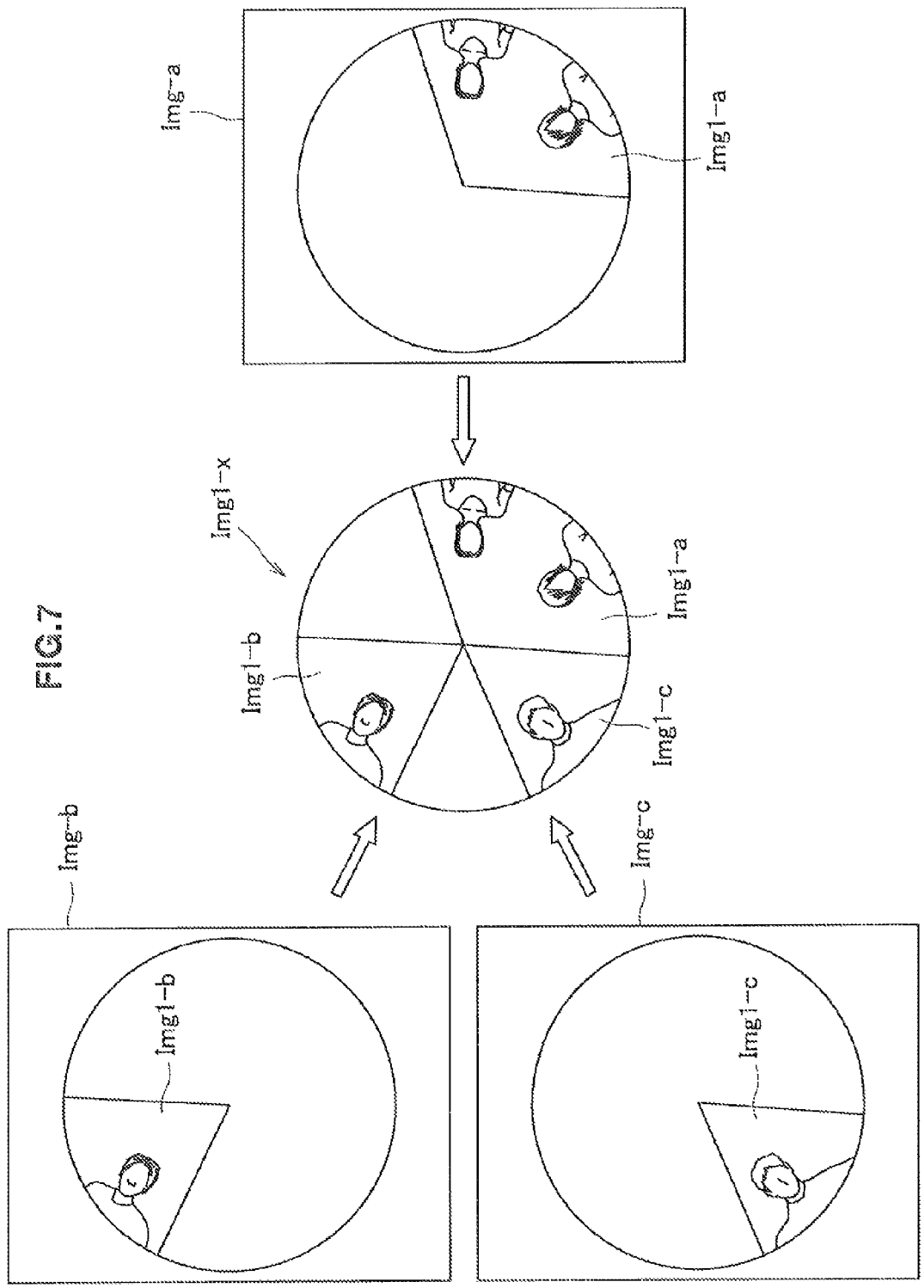
FIG. 7 is a diagram illustrating a detailed function of the communication system according to the first embodiment of the present disclosure.

Next, a function of the communication system 1A according to the first embodiment of the present disclosure will be described in detail. FIG. 7 is a diagram illustrating the function of the communication system 1A according to the first embodiment of the present disclosure in detail. As described above, the example illustrated in FIG. 7 mentions the case where the communication system 1A includes the three communication terminals 10A (communication terminal 10A-a, communication terminal 10A-b, and communication terminal 10A-c) as the example of the plurality of communication terminals 10A. However, the number of communication terminals 10A that the communication system 1A includes is not particularly limited as far as the communication system 1A includes the plurality of communication terminals 10A.

As illustrated in FIG. 7, a captured image acquisition unit 111 of the communication terminal 10A-a acquires a captured image Img-a. A captured image acquisition unit 111 of the communication terminal 10A-b similarly acquires a captured image Img-b, and a captured image acquisition unit 111 of the communication terminal 10A-c acquires a captured image Img-c. When the image determination unit 112 determines that the user U is not projected on the captured image, it is omitted that the image extraction unit 114 extracts an extracted image, etc.

Next, an image extraction unit 114 of the communication terminal 10A-a extracts an image of a predetermined region from the captured image Img-a as an extracted image Img1-a. Here, the predetermined region may be, for example, a region including a region having the user U projected thereon. The region having the user U projected thereon may be a region in the captured image Img-a, in which a difference is generated, or a region in the captured image Img-a, in which a facial region is present. An image extraction unit 114 of the communication terminal 10A-b similarly extracts an image of a predetermined region from the captured image Img-b as an extracted image Img1-b, and an image extraction unit 114 of the communication terminal 10A-c extracts an image of a predetermined region from the captured image Img-c as an extracted image Img1-c.

Next, a combined image acquisition unit 116 of the communication terminal 10A-a acquires a combined image Img1-x generated by arranging the extracted image Img1-a, the extracted image Img1-b from the communication terminal 10A-b, and the extracted image Img1-c from the communication terminal 10A-c. Here, the information processing apparatus 20 may generate the combined image Img1-x, or the communication terminal 10A-a, the communication terminal 10A-b, and the communication terminal 10A-c may generate the combined image Img1-x. Suppose in the present embodiment that the information processing apparatus 20 may generate the combined image Img1-x.

Thus, an extracted image providing unit 115 of the communication terminal 10A-a provides the extracted image Img1-a to the information processing apparatus 20. An extracted image providing unit 115 of the communication terminal 10A-b similarly provides an extracted image Img1-b to the information processing apparatus 20, and an extracted image providing unit 115 of the communication terminal 10A-c provides an extracted image Img1-c to the information processing apparatus 20.

Next, an extracted image acquisition unit 211 of the information processing apparatus 20 acquires the extracted image Img1-a from the communication terminal 10A-a. An extracted image acquisition unit 211 of the communication terminal 10A-b similarly acquires the extracted image Img1-b from the communication terminal 10A-b, and the extracted image Img1-c from the communication terminal 10A-c. An image combining unit 212 of the information processing apparatus 20 arranges the extracted image Img1-a, the extracted image Img1-b, and the extracted image Img1-c to generate the combined image.

It is not particularly limited how the image combining unit 212 arranges the extracted image Img1-a, the extracted image Img1-b, and the extracted image Img1-c. As illustrated in FIG. 7, when the extracted image Img1-a, the extracted image Img1-b, and the extracted image Img1-c have sectorial shapes, the image combining unit 212 arranges the extracted image Img1-a, the extracted image Img1-b, and the extracted image Img1-c in a circular shape to generate a combined image Img1-x.

It is also not particularly limited at which positions the extracted image Img1-a, the extracted image Img1-b, and the extracted image Img1-c are arranged. For example, the image combining unit 212 may arrange the extracted image Img1-a, the extracted image Img1-b, and the extracted image Img1-c at predefined positions. Alternatively, the image combining unit 212 may arrange the extracted image Img1-a, the extracted image Img1-b, and the extracted image Img1-c at positions according to relationships of users U projected on the extracted image Img1-a, the extracted image Img1-b, and the extracted image Img1-c. For example, the stronger the relationships of the users U projected on extracted images are, the more the image combining unit 212 may approximate the extracted images to each other. The relationships of the users U can be registered in advance.

Next, a combined image acquisition unit 116 of the communication terminal 10A-a acquires the combined image Img1-x generated by the information processing apparatus 20. An extracted image acquisition unit 211 of the communication terminal 10A-b similarly acquires the combined image Img1-x generated by the information processing apparatus 20, and an extracted image acquisition unit 211 of the communication terminal 10A-c acquires the combined image Img1-x generated by the information processing apparatus 20.

Next, a display control unit 117 of the communication terminal 10A-a controls a display unit 180 of the communication terminal 10A-a such that the combined image Img1-x is displayed on the display unit 180 of the communication terminal 10A-a. A display control unit 117 of the communication terminal 10A-b similarly controls a display unit 180 of the communication terminal 10A-b such that the combined image Img1-x is displayed on the display unit 180 of the communication terminal 10A-b. A display control unit 117 of the communication terminal 10A-c also controls a display unit 180 of the communication terminal 10A-c such that the combined image Img1-x is displayed on the display unit 180 of the communication terminal 10A-c.

As described above, the function of the communication system 1A according to the first embodiment of the present disclosure has been explained in detail.

[1-8. Advantageous Effects Attained by Communication System]

Figure 8:
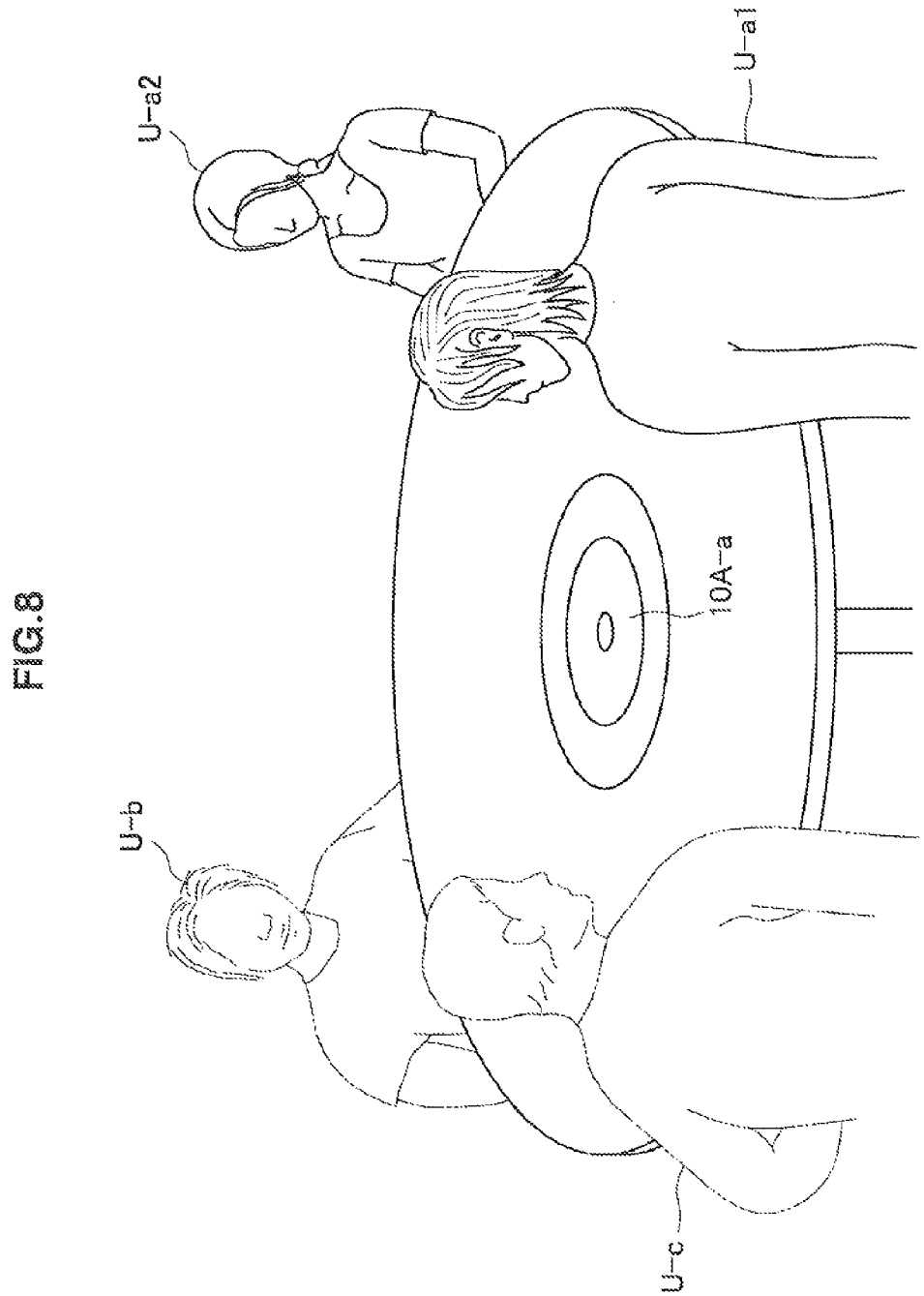
FIG. 8 is a diagram illustrating advantageous effects attained by the communication system according to the first embodiment of the present disclosure.

Next, advantageous effects attained by the communication system 1A according to the first embodiment of the present disclosure will be described. FIG. 8 is a diagram illustrating the advantageous effects attained by the communication system 1A according to the first embodiment of the present disclosure.

As illustrated in FIG. 8, participants (user U-a1 and user U-a2) present at a point a are able to attempt to communicate with another participant (user U-b) present at a point b and still another participant (user U-c) present at a point c while watching the display result of the communication terminal 10A-a.

As described above, according to the communication system 1A, when captured images of a plurality of participants (user U-a1, user U-a2, user U-b, and user U-c) are each projected on a screen, it becomes possible to easily reduce the possibility that a region that is not desired to be watched by another participant is projected on the screen. The function control as described above can reduce the possibility that a sound is transmitted at timing that is not intended by the user. In this way, according to the communication system 1A, it becomes possible to reduce the possibility of privacy invasion.

The extracted image Img1-a on which a participant watching the communication terminal 10-A-a is projected, the extracted image Img1-b on which the user U-b is projected, and the extracted Img1-c on which the user U-c is projected are equally arranged and displayed in the communication terminal 10A-a. Thus, for example, closer communication with a participant present at a different point is expected. Additionally, since each participant watches the same combined image Img1-x, the participants are less likely to misunderstand each other and are able to attempt communication feeling that the participants look into the same mirror.

It is also not limited how many extracted images are combined. The communication system 1A can therefore be used in communication between two people as well as communication among three people.

As described above, the advantageous effects attained by the communication system 1A according to the first embodiment of the present disclosure have been explained.

[1-9. Regeneration of Combined Image(First Example)]

Figure 9:
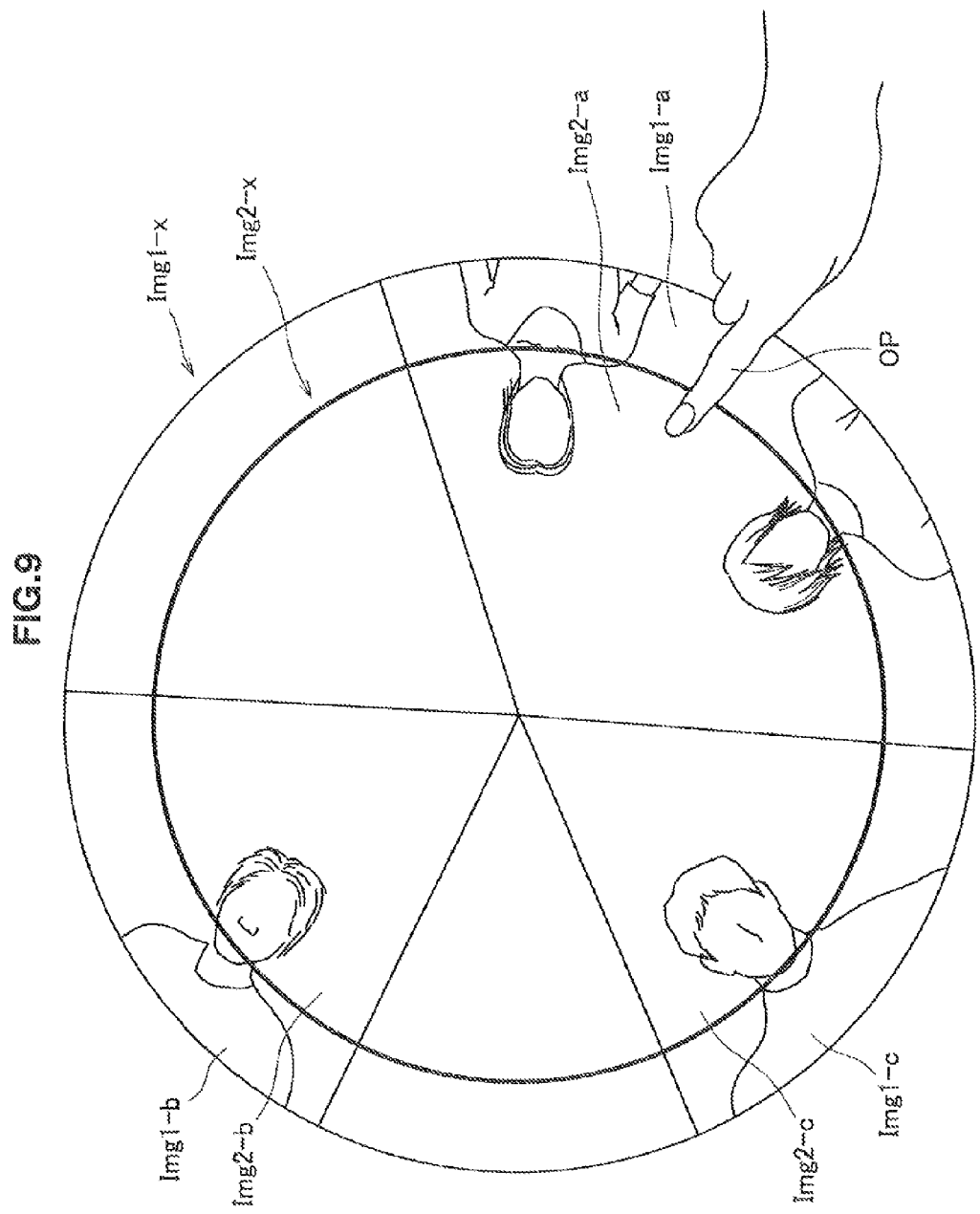
FIG. 9 is a diagram illustrating a first example of regeneration of a combined image by an image combining unit.

Next, a first example of regeneration of a combined image by the image combining unit 212 will be described. FIG. 9 is a diagram illustrating the first example of the regeneration of the combined image by the image combining unit 212. For example, as illustrated in FIG. 9, a user U who has watched a combined image Img1-x possibly desires to narrow the combined image Img1-x, for example, when a region that is not desired to be watched by another participant is projected on the combined image Img1-x, etc. A user manipulation through the manipulation unit 140 allows the user to designate a region. For example, the region is designated through a manipulation (such as a drag manipulation) by the manipulating object OP.

In this case, the image combining unit 212 is capable of providing, as a new combined image, an image according to the region designated through the user manipulation in the combined image Img1-x. FIG. 9 illustrates the example in which the image combining unit 212 provides an image of the region designated through a user manipulation as a new combined image Img2-x.

Meanwhile, the user U who has watched the combined image Img1-x possibly desires to adjust the size of the region designated through a user manipulation in the combined image Img1-x, for example, when the combined image Img1-x includes a region that is desired to be watched in further detail, etc. For example, the image combining unit 212 may provide, as a new combined image, an image obtained by enlarging the region designated though the user manipulation in the combined image Img1-x. The region designated through the user manipulation may be enlarged in any way.

For example, the region designated through the user manipulation may be enlarged by using a technique of visualizing a hyperboloid as disclosed in John Lamping and Ramana Rao, "Visualizing Large Trees Using the Hyperbolic Browser," ACM CHI '96 (Internet search URL <http://www.sigchi.org/chi96/proceedings/videos/Lamping/hb-video.html> retrieved on Sep. 13, 2012).

As described above, the first example of the regeneration of the combined image by the image combining unit 212 has been explained.

[1-10. Regeneration of Combined Image(Second Example)]

Next, a second example of the regeneration of the combined image by the image combining unit 212 will be described. FIG. 10 is a diagram illustrating the second example of the regeneration of the combined image by the image combining unit 212. For example, as illustrated in FIG. 10, a user U who has watched a combined image Img1-x possibly desires to move an extracted image, for example. A user manipulation through the manipulation unit 140 allows the user to designate the extracted image. For example, the extracted image is designated through a manipulation (such as a touch manipulation) by the manipulating object OP.

In this case, the image combining unit 212 can move the designated extracted image through the user manipulation to regenerate a combined image. FIG. 10 illustrates the example in which the image combining unit 212 regenerates a combined image Img3-x by moving an extracted image Img1-b designated thorough the user manipulation. Additionally, as illustrated in FIG. 10, the user manipulation can further designate a movement amount of the extracted image. For example, a manipulation (such as a drag manipulation) through the manipulating object OP decides the movement amount.

Various advantages are conceivable by moving the extracted image Img1-b in this way. For example, it is possible to have a more formal conversation if moving the extracted image Img1-b to a position opposing to an extracted image Img1-c. It is also possible to have a more friendly conversation if moving the extracted image Img1-b to a position next to the extracted image Img1-c. In this way, it is possible to use metaphor of a conversation in a real space.

As described above, the second example of the regeneration of the combined image by the image combining unit 212 has been explained.

[1-11. Example of Process to be Executed]

Figure 11:
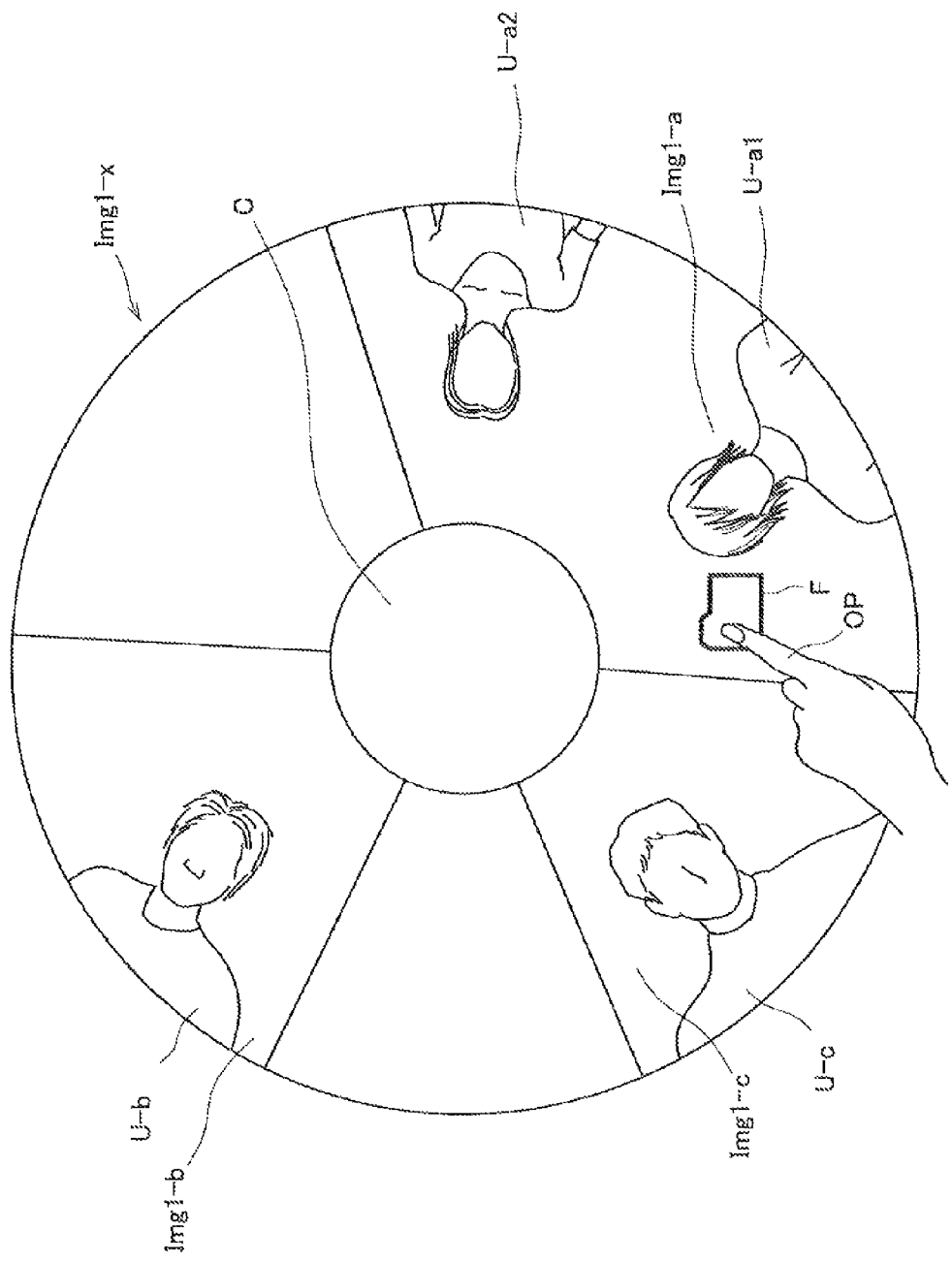
FIG. 11 is a diagram illustrating an example of a process to be executed by a processing unit.

Next, an example of a process to be executed by the processing unit 118 will be described. FIG. 11 is a diagram illustrating the example of the process to be executed by the processing unit 118. As illustrated in FIG. 11, for example, when a user U-c who is projected on the extracted image Img1-c holds content, an object F corresponding to the content may be displayed. That is, a display control unit 117 of the communication terminal 10A-c may perform control such that the object F is displayed on the combined image Img1-x. The type of content is not particularly limited. For example, content may be text data, image data, audio data, or other data.

When a user manipulation moves the object F, the processing unit 118 may also move the content corresponding to the object F. In the example illustrated in FIG. 11, for example, when a user manipulation moves the object F from an extracted image Img1-c to an extracted image Img1-a, a processing unit 118 of a communication terminal 10A-c may move the content corresponding to the object F to the communication terminal 10A-a. Not the content, but a copy of the content may be moved instead.

The display control unit 117 of the communication apparatus 10A-c may also perform control such that a shared region C is displayed on the combined image Img1-x. The shared region C is a region accessible from the communication terminal 10A-a, the communication terminal 10A-b, and the communication terminal 10A-c. The shared region C may be provided in the storage unit 220 of the information processing apparatus 20, any of the communication terminals 10A, or another storage medium.

For example, when a user manipulation moves the object F from the extracted image Img1-c to the shared region C, the processing unit 118 of the communication terminal 10A-c may move the content corresponding to the object F to a region accessible from the communication terminal 10A-a, the communication terminal 10A-b, and the communication terminal 10A-c. Not the content, but a copy of the content may be moved instead.

As described above, the example of the process to be executed by the processing unit 118 has been explained.

[1-12. Exterior (Second Example) of Communication Terminal]

Figure 12:
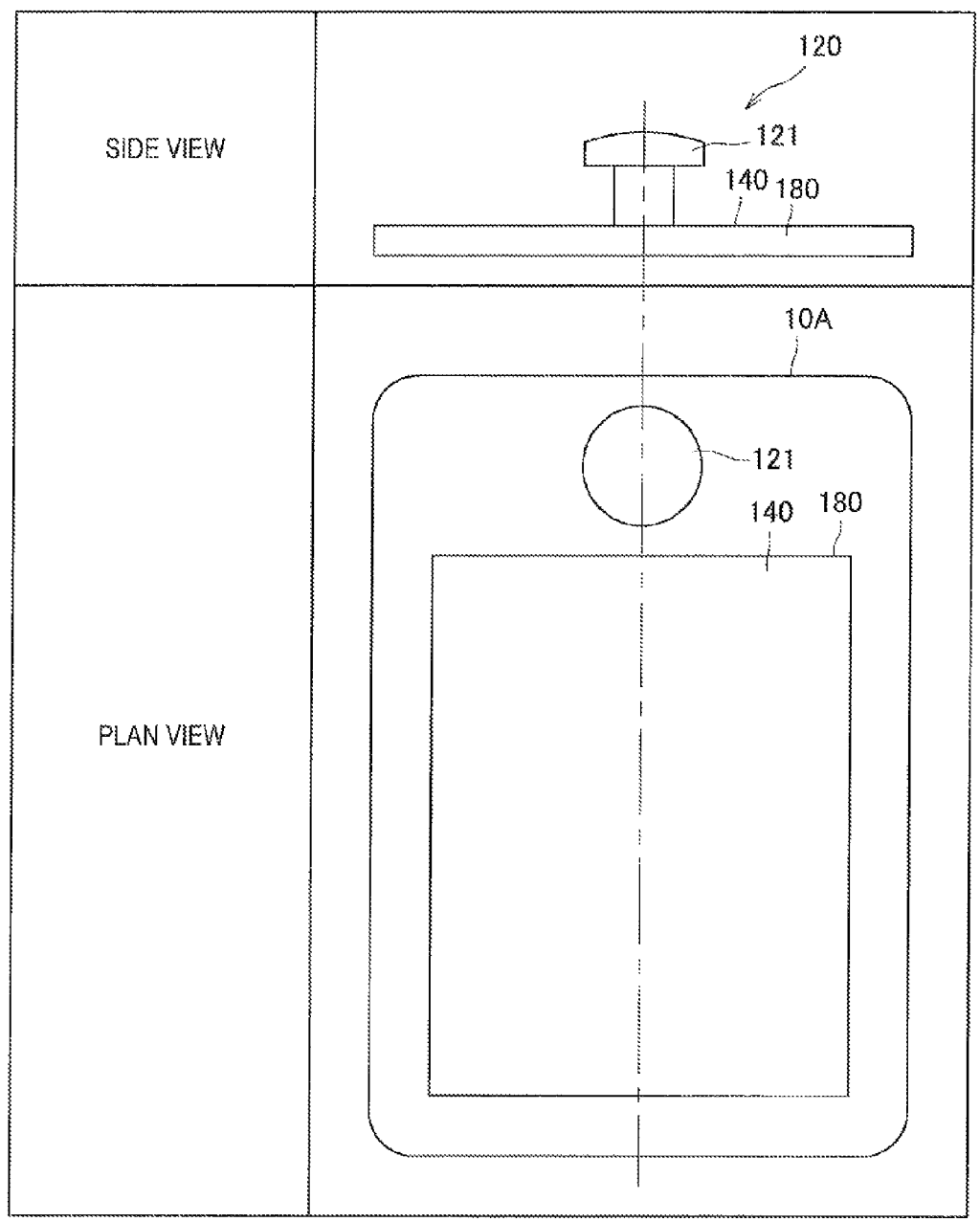
FIG. 12 is a diagram illustrating a second example of the exterior of the communication terminal according to the first embodiment of the present disclosure.

Next, a second example of the exterior of one of the communication terminals 10A according to the first embodiment of the present disclosure will be described. FIG. 12 is a diagram illustrating the second example of the exterior of one of the communication terminals 10A according to the first embodiment of the present disclosure. As described above, the image capturing unit 120 is provided at the predetermined position in one of the communication terminals 10A. For example, as illustrated in FIG. 12, the image capturing unit 120 may be provided in a mobile terminal. The mobile terminal may be a smartphone, a tablet terminal, or Personal Digital Assistants (PDA).

As described above, the second example of the exterior of one of the communication terminals 10A according to the first embodiment of the present disclosure has been explained.

[1-13. Operation of Communication System]

Figure 13:
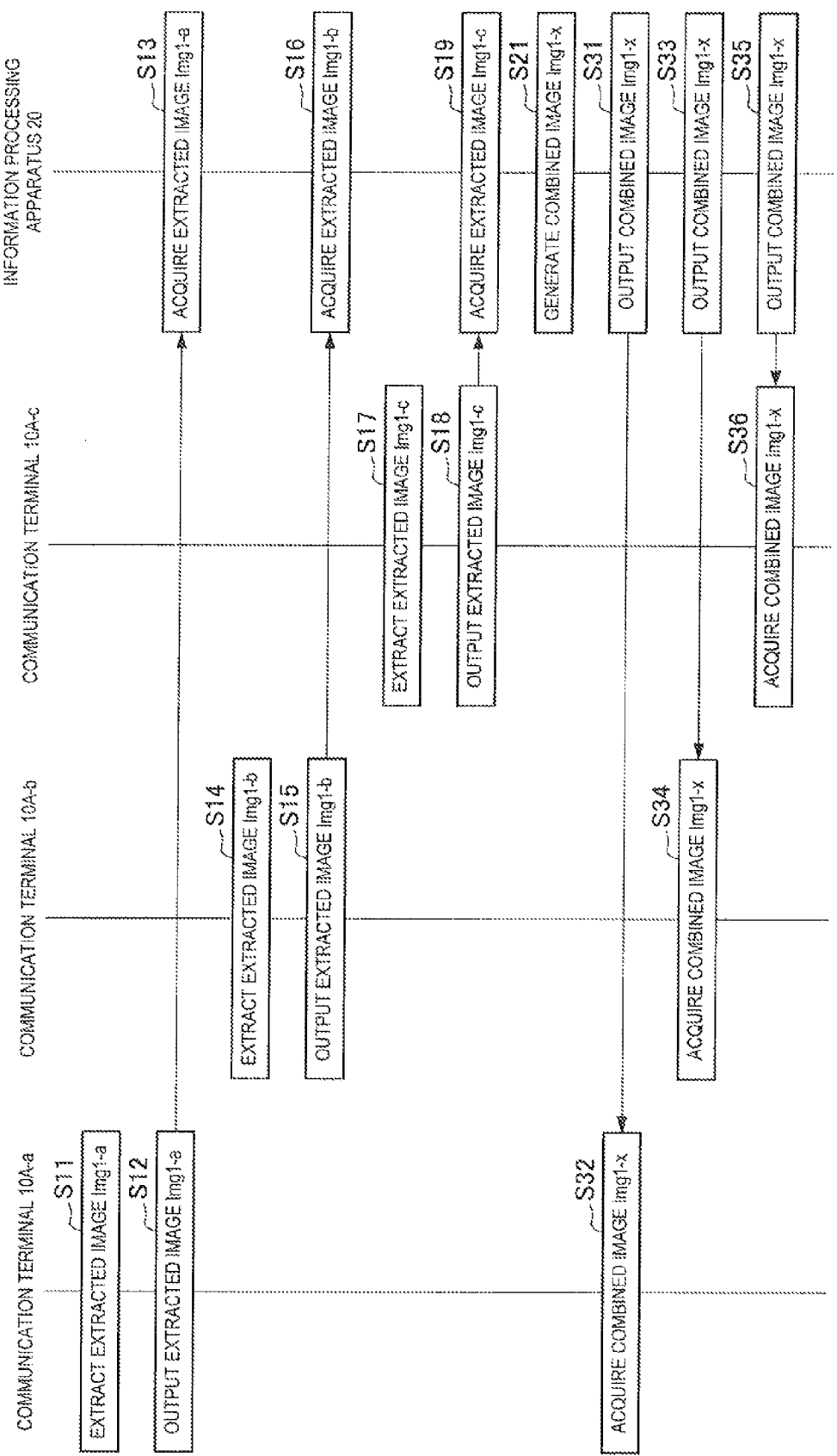
FIG. 13 is a diagram illustrating an example of an operation flow of the communication system according to the first embodiment of the present disclosure.

Next, an example of an operation flow of the communication system 1A according to the first embodiment of the present disclosure will be described. FIG. 13 is a diagram illustrating the example of the operation flow of the communication system 1A according to the first embodiment of the present disclosure. FIG. 13 merely illustrates the example of the operation of the communication system 1A. Accordingly, needless to say, the operation of the communication system 1A is not limited to the example illustrated in FIG. 13.

As illustrated in FIG. 13, the captured image acquisition unit 111 acquires a captured image Img-a in the communication terminal 10A-a, and the image extraction unit 114 extracts an extracted image Img1-a from the captured image Img-a (S11). Next, the extracted image providing unit 115 outputs, in the communication terminal 10A-a, the extracted image Img1-a to the information processing apparatus 20 (S12). The extracted image acquisition unit 211 of the information processing apparatus 20 acquires the extracted image Img1-a (S13).

The captured image acquisition unit 111 similarly acquires a captured image Img-b in the communication terminal 10A-b, and the image extraction unit 114 extracts an extracted image Img1-b from the captured image Img-b (S14). Next, the extracted image providing unit 115 outputs, in the communication terminal 10A-b, the extracted image Img1-b to the information processing apparatus 20 (S15). The extracted image acquisition unit 211 of the information processing apparatus 20 acquires the extracted image Img1-b (S16).

The captured image acquisition unit 111 also acquires a captured image Img-c in the communication terminal 10A-c, and the image extraction unit 114 extracts an extracted image Img1-c from the captured image Img-c (S17). Next, the extracted image providing unit 115 outputs, in the communication terminal 10A-c, the extracted image Img1-c to the information processing apparatus 20 (S18). The extracted image acquisition unit 211 of the information processing apparatus 20 acquires the extracted image Img1-c (S19).

Next, the image combining unit 212 combines the extracted image Img1-a, the extracted image Img1-b, and the extracted image Img1-c in the information processing apparatus to generate a combined image Img1-x (S21). Next, the combined image providing unit 213 outputs the combined image Img1-x to the communication terminal 10A-a (S31). The combined image acquisition unit 116 acquires the combined image Img1-x in the communication terminal 10A-a (S32).

The combined image providing unit 213 similarly outputs the combined image Img1-x to the communication terminal 10A-b (S33). The combined image acquisition unit 116 acquires the combined image Img1-x in the communication terminal 10A-b (S34). The combined image providing unit 213 also outputs the combined image Img1-x to the communication terminal 10A-c (S35). The combined image acquisition unit 116 acquires the combined image Img1-x in the communication terminal 10A-c (S36).

The display control unit 117 performs control in each of the communication terminal 10A-a, the communication terminal 10A-b, and the communication terminal 10A-c such that the combined image Img1-x is displayed. A user of each of the communication terminal 10A-a, the communication terminal 10A-b, and the communication terminal 10A-c is able to attempt to communicate with another user while watching the display result.

As described above, the example of the operation flow of the communication system 1A according to the first embodiment of the present disclosure has been explained.

[[2. Second Embodiment]]

Next, a second embodiment of the present disclosure will be described.

[2-1. Configuration Example of Communication System]

Figure 14:
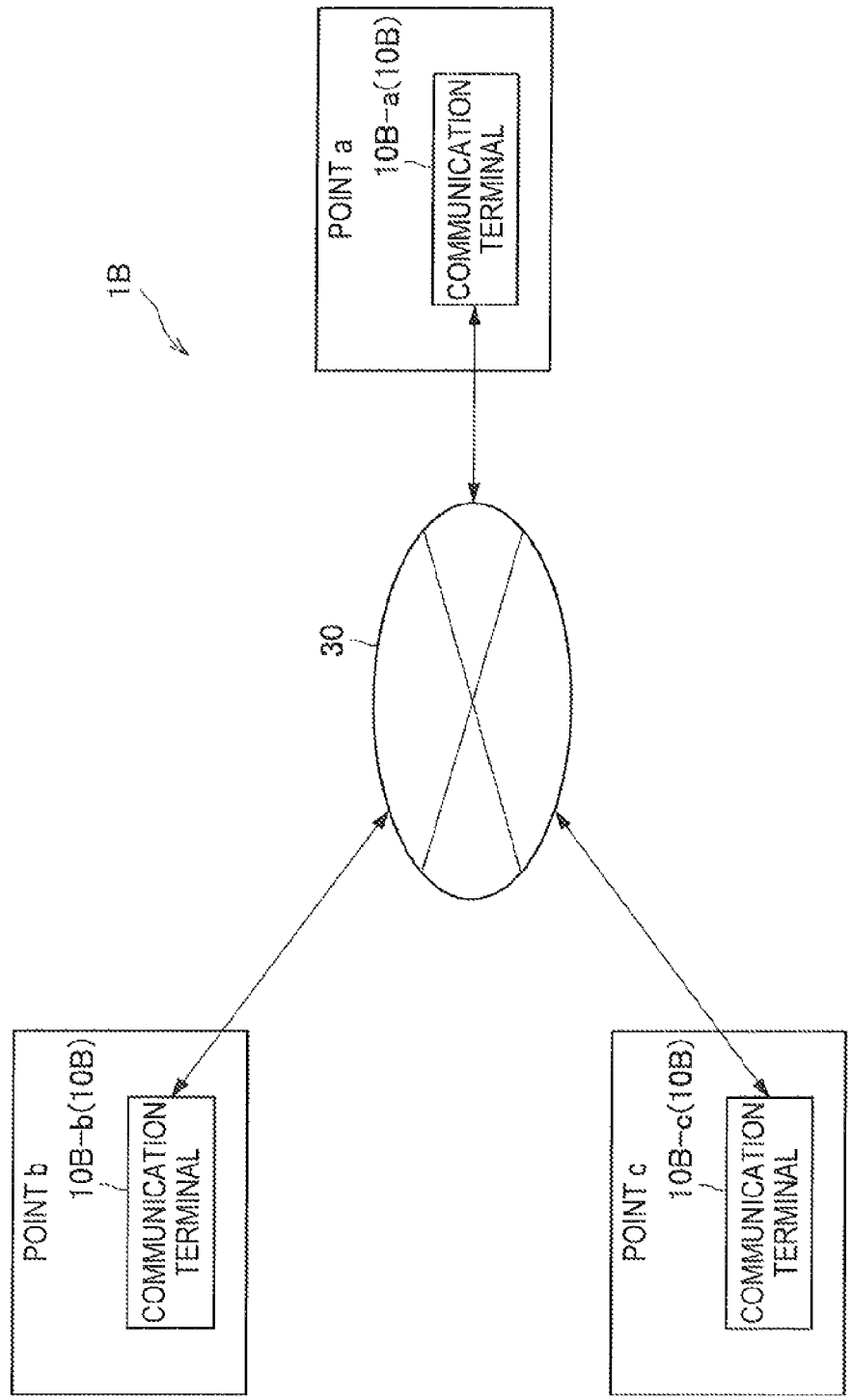
FIG. 14 is a diagram illustrating a configuration example of a communication system according to a second embodiment of the present disclosure.

First of all, a configuration example of a communication system 1B according to a second embodiment of the present disclosure will be described. FIG. 14 is a diagram illustrating the configuration example of the communication system 1B according to the second embodiment of the present disclosure. As illustrated in FIG. 14, the communication system 1B according to the second embodiment of the present disclosure does not include the information processing apparatus 20. Thus, although a combined image is generated in the information processing apparatus 20 in the communication system 1A according to the first embodiment of the present disclosure, a combined image is generated in communication terminals 10B in the communication system 1B according to the second embodiment of the present disclosure.

As described above, the configuration example of the communication system 1B according to the second embodiment of the present disclosure has been explained.

[2-2. Functional Configuration Example of Communication Terminal]

Figure 15:
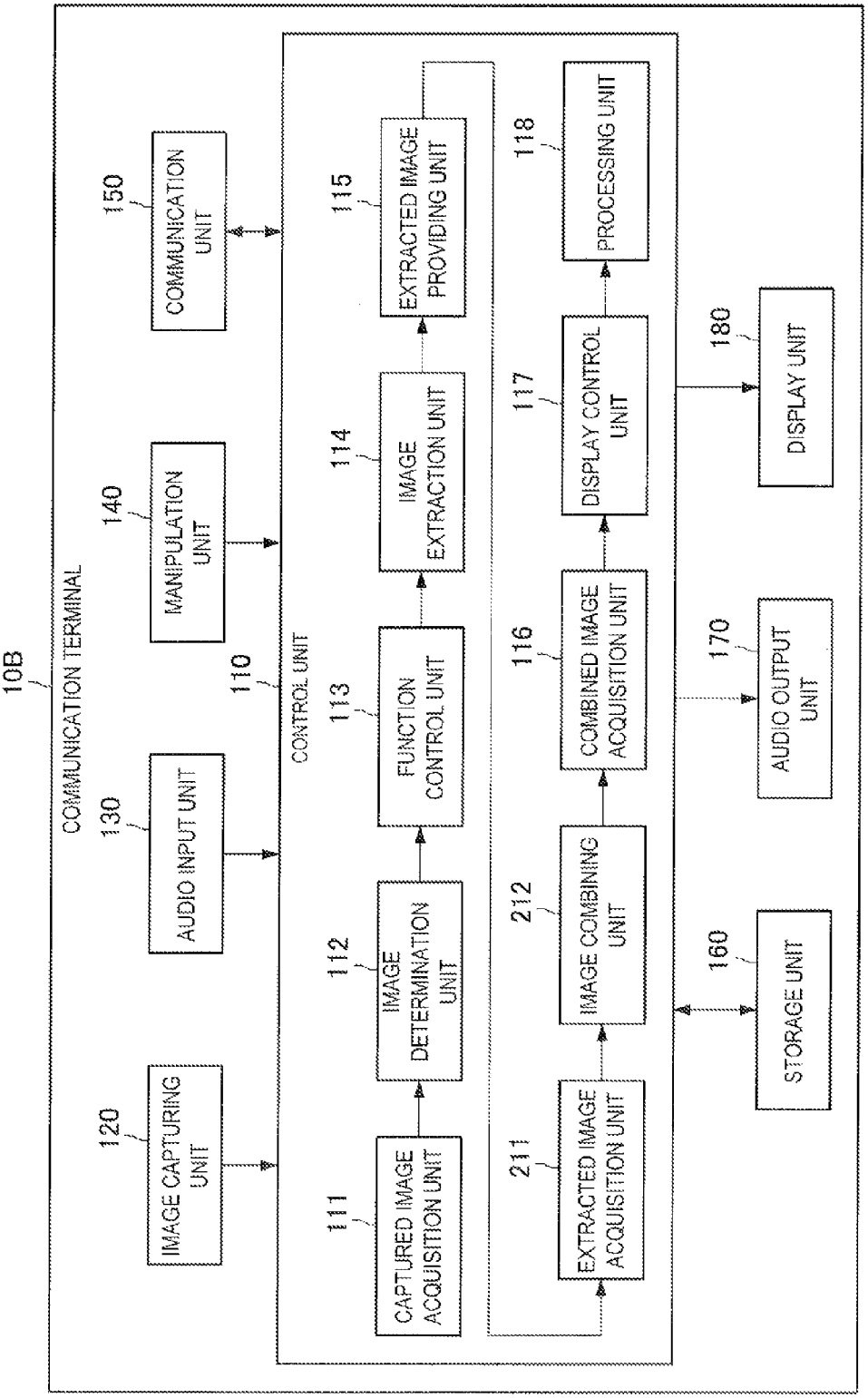
FIG. 15 is a diagram illustrating a functional configuration example of a communication terminal according to the second embodiment of the present disclosure.

Next, a functional configuration example of one of the communication terminals 10B according to the second embodiment of the present disclosure will be described. FIG. 15 is a diagram illustrating the functional configuration example of one of the communication terminals 10B according to the second embodiment of the present disclosure. As illustrated in FIG. 15, the communication terminals 10B according to the second embodiment of the present disclosure each include an extracted image acquisition unit 211 and an image combining unit 212. The communication terminals 10B according to the second embodiment of the present disclosure include the same functional blocks for the rest of the parts as the communication terminals 10A according to the first embodiment of the present disclosure.

As described above, the functional configuration example of one of the communication terminal 10B according to the second embodiment of the present disclosure has been explained.

[2-3. Operation of Communication System]

Next, an example of an operation flow of the communication system 1B according to the second embodiment of the present disclosure will be described. FIG. 16 is a diagram illustrating the example of the operation flow of the communication system 1B according to the second embodiment of the present disclosure. Additionally, FIG. 16 merely illustrates the example of the operation of the communication system 1B. Accordingly, needless to say, the operation of the communication system 1B is not limited to the example illustrated in FIG. 16.

As illustrated in FIG. 16, a captured image acquisition 111 acquires a captured image Img-a in a communication terminal 10B-a, and an image extraction unit 114 extracts an extracted image Img-1-a from the captured image Img-a (S41). Next, an extracted image providing unit 115 outputs, in the communication terminal 10B-a, the extracted image Img1-a to a communication terminal 10B-b (S42). An extracted image acquisition unit 211 of the communication terminal 10B-b acquires an extracted image Img1-a (S43).

An extracted image providing unit 115 similarly outputs, in the communication terminal 10B-a, the extracted image Img1-a to a communication terminal 10B-c (S44). An extracted image acquisition unit 211 of the communication terminal 10B-c acquires the extracted image Img1-A (S45).

Next, a captured image acquisition unit 111 acquires a captured image Img-b, and an image extraction unit 114 extracts an extracted image Img1-b from the captured image Img-b in the communication terminal 10B-b (S51). Next, an extracted image providing unit 115 outputs, in the communication terminal 10B-b, the extracted image Img1-b to the communication terminal 10B-a (S52). The extracted image acquisition unit 211 of the communication terminal 10B-a acquires the extracted image Img1-b (S53).

The extracted image providing unit 115 similarly outputs, in the communication terminal 10B-b, the extracted image Img1-a to the communication terminal 10B-c (S54). The extracted image acquisition unit 211 of the communication terminal 10B-c acquires the extracted image Img1-b (S55).

Next, a captured image acquisition unit 111 acquires a captured image Img-c in the communication terminal 10B-c, and an image extraction unit 114 extracts an extracted image Img1-c from the captured image Img-c (S61). Next, an extracted image providing unit 115 outputs, in the communication terminal 10B-c, the extracted image Img1-c to the communication terminal 10B-a (S62). The extracted image acquisition unit 211 of the communication terminal 10B-a acquires the extracted image Img1-c (S63).

The extracted image providing unit 115 similarly outputs, in the communication terminal 10B-c, the extracted image Img1-c to the communication terminal 10B-b (S64). The extracted image acquisition unit 211 of the communication terminal 10B-b acquires the extracted image Img1-c (S65).

Next, an image combining unit 212 combines the extracted image Img1-a, the extracted image Img1-b, and the extracted image Img1-c in the communication terminal 10B-a to generate a combined image Img1-x (S71). An image combining unit 212 similarly combines the extracted image Img1-a, the extracted image Img1-b, and the extracted image Img1-c in the communication terminal 10B-b to generate the combined image Img1-x (S72). An image combining unit 212 combines the extracted image Img1-a, the extracted image Img1-b, and the extracted image Img1-c in the communication terminal 10B-c to generate the combined image Img1-x (S73).

In the same way as the first embodiment of the present disclosure, it is not particularly limited at which positions the extracted image Img1-a, the extracted image Img1-b, and the extracted image Img1-c are arranged. For example, the image combining unit 212 may dispose the extracted image Img1-a, the extracted image Img1-b, and the extracted image Img1-c at predefined positions. However, it is necessary that information indicating the predefined positions is shared among the communication terminal 10B-a, the communication terminal 10B-b, and the communication terminal 10B-c.

The display control unit 117 performs control in each of the communication terminal 10B-a, the communication terminal 10B-b, and the communication terminal 10B-c such that the combined image Img1-x is displayed. A user of each of the communication terminal 10B-a, the communication terminal 10B-b, and the communication terminal 10B-c is able to attempt to communicate with another user while watching the display result.

As described above, the example of the operation flow of the communication system 1B according to the second embodiment of the present disclosure has been explained.

[[3. Conclusion]]

As described above, according to the embodiments of the present disclosure, it is possible to provide the plurality of communication terminals 10A each including the captured image acquisition unit 111 configured to acquire a captured image that is captured by the image capturing unit 120, the image capturing unit 120 setting an upward direction as the image capturing direction, the image extraction unit 114 configured to extract an image of a predetermined region from the captured image as an extracted image, the combined image acquisition unit 116 configured to acquire a combined image generated by arranging the extracted image and an extracted image from one or more of the other communication terminals 10A, and the display control unit 117 configured to perform control in a manner that the combined image is displayed.

According to the above-described configuration, when a captured image of each of a plurality of participants is projected on a screen, it is possible to easily reduce the possibility that a region which is not desired to be watched by another participant is projected on the screen.

It should be understood by those skilled in the art that various modifications, combinations, sub-combinations and alterations may occur depending on design requirements and other factors insofar as they are within the scope of the appended claims or the equivalents thereof.

For example, the respective steps in the example of the operation of the communication system in the present specification do not necessarily have to be processed chronologically in order described as a sequence diagram. For example, the respective steps in the example of the operation of the communication system may be processed in order different from the order described as the sequence diagram, or may be processed in parallel.

It is also possible to manufacture a program for performing a function equivalent to the above-described communication terminal and information processing apparatus each configured to include hardware such as a CPU, ROM, and RAM built in a computer. There may also be provided a computer-readable recording medium having the program recorded thereon.

Additionally, the present technology may also be configured as below.

(1) A communication terminal including:

a captured image acquisition unit configured to acquire a captured image that is captured by an image capturing unit, the image capturing unit setting an upward direction as an image capturing direction;

an image extraction unit configured to extract an image of a predetermined region from the captured image as an extracted image;

a combined image acquisition unit configured to acquire a combined image generated by arranging the extracted image and an extracted image from one or more other communication terminals; and a display control unit configured to perform control in a manner that the combined image is displayed.

(2) The communication terminal according to (1), wherein the image capturing unit is provided at a predetermined position in the communication terminal.

(3) The communication terminal according to (1) or (2), further including:

an image determination unit configured to determine whether a user is projected on the captured image, and to obtain a determination result; and a function control unit configured to control a predetermined function of the communication terminal in accordance with the determination result.

(4) The communication terminal according to (3), wherein, when the determination result indicates that the user is projected on the captured image, the function control unit validates the predetermined function of the communication terminal.

(5) The communication terminal according to (3), wherein, when the determination result indicates that the user is not projected on the captured image, the function control unit limits the predetermined function of the communication terminal.

(6) The communication terminal according to (3) or (4), wherein, when the communication terminal includes an audio input unit configured to receive an input of a sound, and a communication unit configured to transmit the sound to the one or more other communication terminals, the predetermined function includes at least a function of transmitting the sound, the function being performed by the communication unit.

(7) The communication terminal according to (3) or (4), wherein, when the communication terminal includes an audio input unit configured to receive an input of a sound, and a communication unit configured to transmit the sound to the one or more other communication terminals, the predetermined function includes at least a function of receiving the input of the sound, the function being performed by the audio input unit.

(8) The communication terminal according to any one of (3) to (7), wherein the image determination unit determines whether the user is projected on the captured image, in accordance with whether a difference is generated in a plurality of the captured images.

(9) The communication terminal according to any one of (3) to (7), wherein the image determination unit determines whether the user is projected on the captured image, in accordance with whether a facial region is present in the captured image.

(10) The communication terminal according to any one of (1) to (9), wherein the display control unit performs control in a manner that an object is displayed on the combined image, and wherein the communication terminal includes a processing unit configured to move content corresponding to the object when the object is moved by a user manipulation.

(11) The communication terminal according to any one of (1) to (10), further including:

an extracted image providing unit configured to provide the extracted image to an information processing apparatus, wherein the combined image acquisition unit acquires the combined image generated by the information processing apparatus.

(12) The communication terminal according to any one of (1) to (10), further including:

an image combining unit configured to generate the combined image.

(13) A program for causing a computer to function as a communication terminal, the communication terminal including a captured image acquisition unit configured to acquire a captured image that is captured by an image capturing unit, the image capturing unit setting an upward direction as an image capturing direction, an image extraction unit configured to extract an image of a predetermined region from the captured image as an extracted image, a combined image acquisition unit configured to acquire a combined image generated by arranging the extracted image and an extracted image from one or more other communication terminals, and a display control unit configured to perform control in a manner that the combined image is displayed.

(14) An information processing apparatus including:

an extracted image acquisition unit configured to acquire extracted images that are extracted from captured images which are captured by a plurality of image capturing units, the plurality of image capturing units setting an upward direction as an image capturing direction; and an image combining unit configured to generate a combined image by arranging the extracted images.

(15) The information processing apparatus according to (14), wherein, when the extracted images each have a sectorial shape, the image combining unit arranges the extracted images in a circular shape to generate the combined image.

(16) The information processing apparatus according to (14) or (15), wherein the image combining unit arranges the extracted images at positions according to a relationship among users projected on the extracted images to generate the combined image.

(17) The information processing apparatus according to any one of (14) to (16), wherein the image combining unit moves an extracted image designated through a user manipulation to regenerate the combined image.

(18) The information processing apparatus according to any one of (14) to (17), wherein the image combining unit sets an image according to a region designated through a user manipulation in the combined images as a new combined image.

The present disclosure contains subject matter related to that disclosed in Japanese Priority Patent Application JP 2012-204277 filed in the Japan Patent Office on Sep. 18, 2012, the entire content of which is hereby incorporated by reference.

What is claimed is:

1. A first communication terminal, comprising:
a central processing unit (CPU) configured to:
   acquire a captured image from an image capturing unit, the image capturing unit configured to set an upward direction as an image capturing direction;
   extract an image of a region from the captured image as a first extracted image;
   acquire a combined image generated based on an arrangement of the first extracted image and a second extracted image from at least one second communication terminal;
   display the combined image;
   determine that a first user is projected on the first extracted image, and obtain a determination result;
   control a function of the first communication terminal based on the determination result;
   display an object on the combined image; and
   move content that corresponds to the object based on a movement of the object by a user manipulation,
   wherein the first extracted image and the second extracted image from the at least one second communication terminal are arranged at determined positions to generate the combined image, wherein the determined positions are set based on the first user projected on the first extracted image and a second user projected on the second extracted image, wherein the first user and the second user communicate with each other.

2. The first communication terminal according to claim 1, wherein the CPU is further configured to control the image capturing unit, and wherein the image capturing unit is at a determined position in the first communication terminal.

3. The first communication terminal according to claim 1, wherein based on the determination result that indicates absence of the projection of the first user on the first extracted image, the CPU is further configured to limit the function of the first communication terminal.

4. The first communication terminal according to claim 1, wherein the CPU is further configured to:
   receive an input of a sound; and
   transmit the sound to the at least one second communication terminal,
   wherein the function includes transmission of the sound.

5. The first communication terminal according to claim 1, wherein the CPU is further configured to:
   receive an input of a sound; and
   transmit the sound to the at least one second communication terminal,
   wherein the function includes reception of the input of the sound.

6. The first communication terminal according to claim 1, wherein the CPU is further configured to determine that the first user is projected on the captured image, based on a difference between a reference image and the captured image.

7. The first communication terminal according to claim 1, wherein the CPU is further configured to determine that the first user is projected on the captured image, based on whether a facial region is present in the captured image.

8. The first communication terminal according to claim 1, wherein the CPU is further configured to:
   provide the first extracted image to an information processing apparatus communicably coupled to the first communication terminal; and
   acquire the combined image generated by the information processing apparatus.

9. The first communication terminal according to claim 1, wherein the CPU is further configured to generate the combined image.

10. A non-transitory computer-readable storage medium having stored thereon, computer-executable instructions that, when executed by a computer, cause the computer to execute operations, the operations comprising:
   acquiring a captured image from an image capturing unit, wherein the image capturing unit sets an upward direction as an image capturing direction;
   extracting an image of a region from the captured image as a first extracted image;
   acquiring a combined image generated by arranging the first extracted image and a second extracted image from at least one second communication terminal;
   displaying the combined image;
   displaying an object on the combined image; and
   moving content corresponding to the object based on a movement of the object by a user manipulation,
   wherein the first extracted image and the second extracted image from the at least one second communication terminal are arranged at determined positions to generate the combined image, wherein the determined positions are set based on a plurality of users projected on the first extracted image and the second extracted image, wherein the plurality of users communicate with each other.

11. An information processing apparatus, comprising:
a central processing unit (CPU) configured to:
  acquire a plurality of extracted images that are extracted from a plurality of captured images, wherein the plurality of captured images are captured by a plurality of image capturing units, the plurality of image capturing units configured to set an upward direction as an image capturing direction;
  generate a combined image based on an arrangement of the plurality of extracted images,
  wherein the plurality of extracted images are arranged at determined positions to generate the combined image, wherein the determined positions are set based on a plurality of users projected on the plurality of extracted images, wherein the plurality of users communicate with each other; and
  move an extracted image of the plurality of extracted images to regenerate the combined image, wherein the extracted image is designated based on a first user manipulation.

12. The information processing apparatus according to claim 11, wherein each of the plurality of extracted images have a sectorial shape, and wherein the CPU is further configured to arrange the plurality of extracted images in a circular shape to generate the combined image.

13. The information processing apparatus according to claim 11, wherein the CPU is further configured to set a new combined image based on a region designated through a second user manipulation in the combined image.

14. An information processing apparatus, comprising: a central processing unit (CPU) configured to: acquire a plurality of extracted images that are extracted from a plurality of captured images, wherein the plurality of captured images are captured by a plurality of image capturing units, the plurality of image capturing units configured to set an upward direction as an image capturing direction; generate a combined image based on an arrangement of the plurality of extracted images, wherein the plurality of extracted images are arranged at determined positions to generate the combined image, wherein the determined positions are set based on a plurality of users projected on the plurality of extracted images, wherein the plurality of users communicate with each other;
  move an extracted image of the plurality of extracted images to regenerate the combined image, wherein the extracted image is designated based on a first user manipulation; and set a new combined image based on a region designated through the user manipulation on the combined image.

* * * * *